US009037307B2

(12) United States Patent
Kaji

(10) Patent No.: US 9,037,307 B2
(45) Date of Patent: May 19, 2015

(54) SUPPLY-AND-DEMAND CONTROL APPARATUS, SUPPLY-AND-DEMAND CONTROL METHOD, AND SUPPLY-AND-DEMAND CONTROL SYSTEM

(75) Inventor: Mitsuru Kaji, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 768 days.

(21) Appl. No.: 13/320,413

(22) PCT Filed: Jan. 11, 2011

(86) PCT No.: PCT/JP2011/000068
§ 371 (c)(1),
(2), (4) Date: Nov. 14, 2011

(87) PCT Pub. No.: WO2011/086886
PCT Pub. Date: Jul. 21, 2011

(65) Prior Publication Data
US 2012/0072040 A1   Mar. 22, 2012

(30) Foreign Application Priority Data

Jan. 12, 2010   (JP) ................................. 2010-004405

(51) Int. Cl.
*G06F 1/28*   (2006.01)
*H02J 3/32*   (2006.01)
(Continued)

(52) U.S. Cl.
CPC ... *H02J 3/32* (2013.01); *H02J 3/14* (2013.01); *H02J 2001/004* (2013.01);
(Continued)

(58) Field of Classification Search
CPC ... Y04S 20/222; Y04S 20/224; Y04S 20/244; G06Q 50/06; H02J 3/008; H02J 3/14; H02J 3/32; H02J 2003/003; H02J 2003/146; H02J 2001/004; Y02B 70/3225; Y02B 70/3275; Y02E 70/30
USPC ................ 700/286, 291, 297; 705/7.11, 7.29, 705/7.31, 7.35, 412
See application file for complete search history.

(56) References Cited

U.S. PATENT DOCUMENTS 5,479,358 A   12/1995   Shimoda et al.
8,364,609 B2*   1/2013   Ozog ............................ 705/412
(Continued)

FOREIGN PATENT DOCUMENTS

CN   1969419   5/2007
JP   2001-35514   2/2001
(Continued)

OTHER PUBLICATIONS

Office Action issued Jun. 12, 2014 in corresponding Chinese patent application No. 201180001392.8 along with Search Report (with English translation).
(Continued)

*Primary Examiner* — M.N. Von Buhr
(74) *Attorney, Agent, or Firm* — Wenderoth, Lind & Ponack, L.L.P.

(57) ABSTRACT

The supply-and-demand control apparatus includes an obtaining unit that obtains power consumption and heat consumption; a forecast processing unit that obtains demand forecast data on each of electric power and an amount of heat using the power consumption and heat consumption, respectively; and a supply-and-demand planning unit that calculates a control parameter for controlling operations of an electricity storage system and a heat pump that supplies heat to a hot water storage tank, by substituting the calculated demand forecast data into a predetermined function. Additionally, a supply-and-demand control unit controls the operations using the control parameter, wherein the supply-and-demand planning unit calculates the control parameter such that electric power generated by a solar power system is distributed to the electricity storage system and the heat pump.

14 Claims, 15 Drawing Sheets

(51) Int. Cl.
*H02J 3/14* (2006.01)
*H02J 1/00* (2006.01)
*H02J 3/00* (2006.01)

(52) U.S. Cl.
CPC ..... *H02J 2003/003* (2013.01); *H02J 2003/146* (2013.01); *Y02E 70/30* (2013.01); *Y02B 70/3225* (2013.01); *Y02B 70/3275* (2013.01); *Y04S 20/222* (2013.01); *Y04S 20/224* (2013.01); *Y04S 20/244* (2013.01)

(56) References Cited

U.S. PATENT DOCUMENTS

| | | | |
|---|---|---|---|
| 8,700,511 B2* | 4/2014 | Kaji | 705/35 |
| 8,735,009 B2 | 5/2014 | Matsubayashi et al. | |
| 2002/0040356 A1* | 4/2002 | Gluck et al. | 705/412 |
| 2007/0068162 A1 | 3/2007 | Komura et al. | |
| 2008/0038604 A1 | 2/2008 | Matsubayashi et al. | |
| 2011/0071882 A1* | 3/2011 | Jakagnanam et al. | 705/10 |
| 2011/0087381 A1* | 4/2011 | Hirato et al. | 700/291 |
| 2011/0208365 A1* | 8/2011 | Miller | 700/291 |
| 2012/0065793 A1* | 3/2012 | Kaji | 700/291 |
| 2012/0078687 A1* | 3/2012 | Ghosh et al. | 705/14.1 |
| 2012/0323390 A1* | 12/2012 | Kobayasi | 700/295 |
| 2013/0013376 A1* | 1/2013 | Kalagnanam et al. | 705/7.35 |

FOREIGN PATENT DOCUMENTS

| | | |
|---|---|---|
| JP | 2001-355514 | 12/2001 |
| JP | 2002-51481 | 2/2002 |
| JP | 2002-252926 | 9/2002 |
| JP | 2003-134664 | 5/2003 |
| JP | 2004-180440 | 6/2004 |
| JP | 2004-236422 | 8/2004 |
| JP | 2005-86953 | 3/2005 |
| JP | 3763767 | 4/2006 |
| JP | 2007-097304 | 4/2007 |
| JP | 2007-151371 | 6/2007 |
| JP | 2009-048536 | 3/2009 |

OTHER PUBLICATIONS

Extended European Search Report issued Apr. 30, 2014 in corresponding European patent application No. 11 73 2761.

International Search Report issued Apr. 19, 2011 in International (PCT) Application No. PCT/JP2011/000068.

A.G. Bakirtzis and P.S. Dokopoulos, "*Short Term Generation Scheduling in a Small Autonomous System With Unconventional Energy Sources*", IEEE Transactions on Power Systems, vol. 3, No. 3, Aug. 1988, pp. 1230-1236.

* cited by examiner

FIG. 3

| Time $t+$ | Energy storage and operating status ($s_t$) ||| Control parameter ($u_t$) |||
|---|---|---|---|---|---|---|
| | Amount of stored electricity × 0.1 kWh | Amount of stored hot water × 1 MJ | Fuel cell 0:Stop 1:Generate power | Storage battery system | Fuel cell | Heat pump |
| 0 | 0 | 0 | 0 | Charged with 0 kW | Start generating power | Stop |
| 0 | 0 | 0 | 1 | Charged with 1 kW | Generate power and store hot water with 1 kW | Stop |
| 0 | 0 | 1 | 0 | Charged with 0 kW | Start generating power | Stop |
| 0 | 0 | 1 | 1 | Charged with 1 kW | Generate power and store hot water with 1 kW | Stop |
| ... | ... | ... | ... | ... | ... | ... |
| 0 | 0 | 55 | 1 | Charged with 0 kW | Stop generating power | Stop |
| 0 | 1 | 0 | 0 | Charged with 0 kW | Start generating power | Stop |
| ... | ... | ... | ... | ... | ... | ... |
| 0 | 1 | 55 | 1 | Charged with 0 kW | Stop generating power | Stop |
| 0 | 2 | 0 | 0 | Charged with 0 kW | Start generating power | Stop |
| ... | ... | ... | ... | ... | ... | ... |
| 0 | 50 | 0 | 0 | Discharged with 1 kW | Start generating power | Store hot water with 1 kW |
| 0 | 50 | 0 | 1 | Discharged with 0 kW | Generate power and store hot water with 1 kW | Store hot water with 1 kW |
| ... | ... | ... | ... | ... | ... | ... |
| 0 | 50 | 55 | 1 | Charged with 0 kW | Stop generating power | Stop |
| 1 | 0 | 0 | 0 | Charged with 0 kW | Start generating power | Stop |
| ... | ... | ... | ... | ... | ... | ... |
| 48 | 49 | 55 | 0 | Discharged with 0.5 kW | Stop generating power | Store hot water with 1 kW |
| 48 | 50 | 0 | 0 | Discharged with 1.5 kW | Start generating power | Stop |
| ... | ... | ... | ... | ... | ... | ... |
| 96 | 50 | 55 | 1 | Discharged with 1 kW | Stop generating power | Stop |

FIG. 7

| Time t+ | Energy storage ($S_t$) | | Control parameter ($u_t$) | |
|---|---|---|---|---|
| | Amount of stored electricity × 0.1 kWh | Amount of stored hot water × 1 MJ | Storage battery system | Heat pump |
| 0 | 0 | 0 | Charged with 1 kW | Store hot water with 1 kW |
| 0 | 0 | 1 | Charged with 1 kW | Store hot water with 1 kW |
| ⋮ | ⋮ | ⋮ | ⋮ | ⋮ |
| 0 | 0 | 55 | Charged with 1 kW | Stop |
| 0 | 1 | 0 | Charged with 1 kW | Store hot water with 1 kW |
| ⋮ | ⋮ | ⋮ | ⋮ | ⋮ |
| 0 | 50 | 55 | Charged with 0 kW | Stop |
| 1 | 0 | 0 | Charged with 1 kW | Store hot water with 1 kW |
| ⋮ | ⋮ | ⋮ | ⋮ | ⋮ |
| 48 | 49 | 55 | Charged with 1 kW | Stop |
| 48 | 50 | 0 | Discharged with 0 kW | Stop |
| ⋮ | ⋮ | ⋮ | ⋮ | ⋮ |
| 96 | 50 | 55 | Discharged with 1 kW | Stop |

| Time t+ | Storage ($s_t$) | | Control ($u_{0,t}$) |
|---|---|---|---|
| | Amount of stored electricity ×0.1 kWh | Amount of stored hot water ×1 MJ | Storage battery system |
| 0 | 0 | 0 | Charged with 1 kW |
| 0 | 0 | 1 | Charged with 1 kW |
| ... | ... | ... | ... |
| 0 | 0 | 55 | Charged with 1 kW |
| 0 | 1 | 0 | Charged with 1 kW |
| ... | ... | ... | ... |
| 0 | 50 | 55 | Charged with 0 kW |
| 1 | 0 | 0 | Charged with 1 kW |
| ... | ... | ... | ... |
| 48 | 49 | 55 | Charged with 1 kW |
| 48 | 50 | 0 | Discharged with 0 kW |
| ... | ... | ... | ... |
| 96 | 50 | 55 | Discharged with 1 kW |

203b:

| Time t+ | Storage ($s_t$) | | Control ($u_{1,t}$) |
|---|---|---|---|
| | Amount of stored electricity ×0.1 kWh | Amount of stored hot water ×1 MJ | Heat pump |
| 0 | 0 | 0 | Store hot water with 1 kW |
| 0 | 0 | 1 | Store hot water with 1 kW |
| ... | ... | ... | ... |
| 0 | 0 | 55 | Stop |
| 0 | 1 | 0 | Store hot water with 1 kW |
| ... | ... | ... | ... |
| 0 | 50 | 55 | Stop |
| 1 | 0 | 0 | Store hot water with 1 kW |
| ... | ... | ... | ... |
| 48 | 49 | 55 | Stop |
| 48 | 50 | 0 | Stop |
| ... | ... | ... | ... |
| 96 | 50 | 55 | Stop |

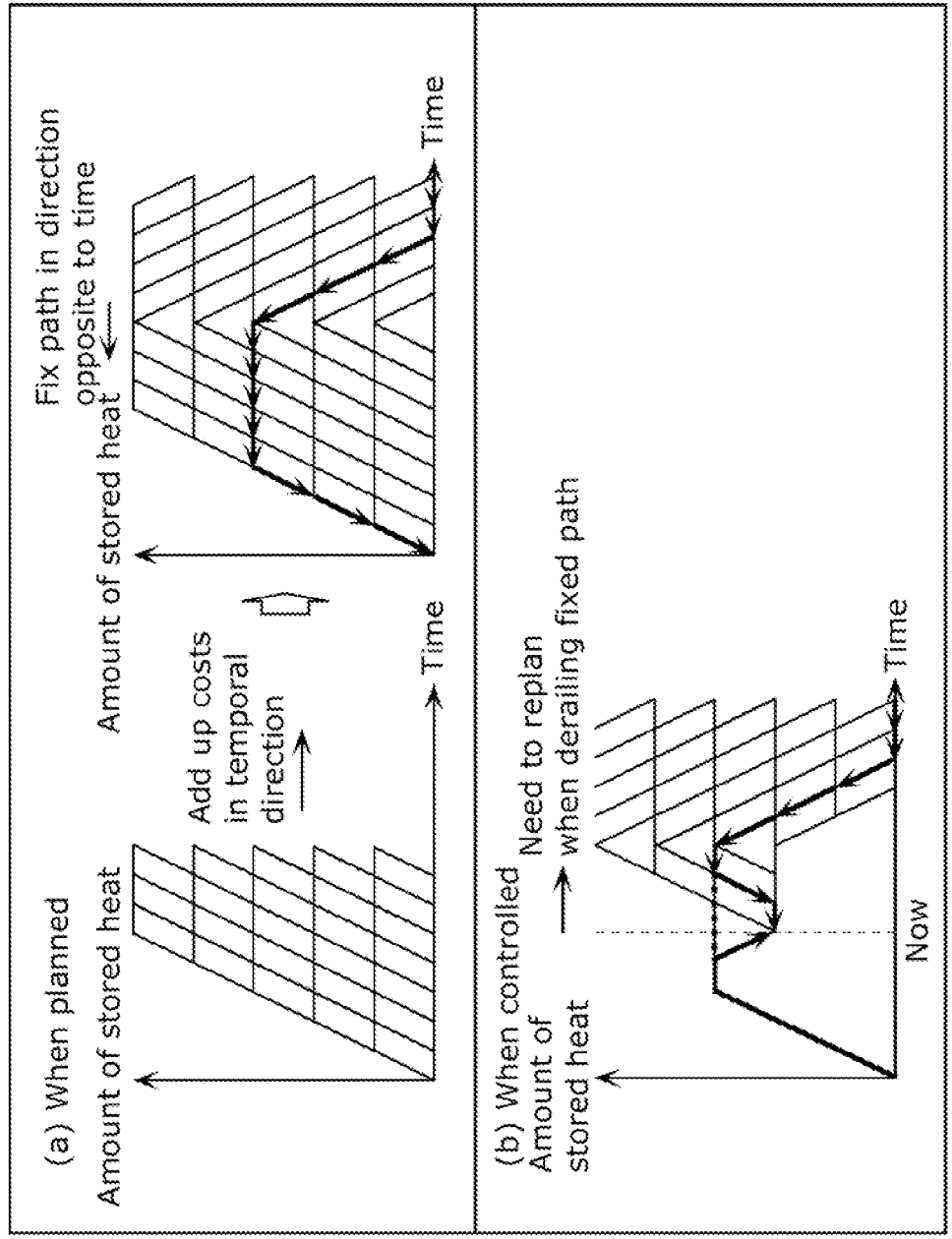

SUPPLY-AND-DEMAND CONTROL APPARATUS, SUPPLY-AND-DEMAND CONTROL METHOD, AND SUPPLY-AND-DEMAND CONTROL SYSTEM

TECHNICAL FIELD

The present invention relates to a supply-and-demand control apparatus, a supply-and-demand control method, and a supply-and-demand control system for calculating an operation plan of an electricity storage device that discharges and charges electric power and a heat source device that supplies heat, in a system that controls operations of the electricity storage device and the heat source device.

BACKGROUND OF INVENTION

Background Art

Conventionally, systems have been studied which operate apparatuses installed in buildings, such as a house and an office building, using renewable energies, such as sunlight, wind power, and geothermal heat. Each of the systems includes an electricity storage device that discharges and charges electric power generated using a renewable energy, and a heat source device that generates heat using city gas or air. With efficient operations of the electricity storage device or the heat source device, it is possible to reduce $CO_2$ discharged by the energy consumption in buildings or electric power consumed in the buildings.

Some renewable energies have already been used to supply energy to buildings. One of the energies is a solar energy generated by the sun. There are some means to use the solar energy. Among them, solar cells are used to directly convert the solar energy into electrical energy. Here, the system that supplies electric power generated by the solar cells to a device that operates using commercial power and others is called a solar power system.

The solar power system can generate clean energy because only the sunlight is used for generating the electric power. However, there is a problem that electric power cannot be generated to meet the demand of a building, because the solar power system is subject to a weather and others and the electrical power output is mainly determined by light energy generated by the sun.

Thus, an electricity storage system has been studied which stores temporarily, in a secondary battery, electric power that cannot be used in a building (surplus electric power) out of the electric power generated by a solar power system and supplies the stored surplus electric power during nighttime and others (for example, see NPL 1). In NPL 1, discharging and charging patterns are calculated with a dynamic planning method, using forecast values of an electrical power output and an electric power demand for the solar power system.

Furthermore, attention is being given to residual heat generated simultaneously when electric power is generated, as another example of a renewable energy. When electric power is generated using fossil fuel, such as city gas, $CO_2$ is discharged even when the power is efficiently generated. In Europe and other countries, the residual heat generated simultaneously when electric power is efficiently generated is defined as a renewable energy. Thus, in order to use the residual heat, attention is being given to co-generation (heat-and-power supply) systems that generate electric power in places where there is a great demand for both electric power and heat. In addition, the co-generation systems using fuel cells have been put to practical use in order to supply energy to buildings, such as houses.

The co-generation systems simultaneously generate electric power and heat. Here, at least one of the generated electric power and heat needs to be temporarily stored and supplied to meet the demand. This is because in general, there is a temporal mismatching between demand of electric power and demand for heat in a building.

In the co-generation systems, a large amount of heat can be stored using hot water, with relatively low cost equipment. Thus, the co-generation systems are used in combination with, for example, (i) heat exchangers that exchange residual heat with hot water and (ii) hot water storage tanks that are equipment for storing the hot water, in addition to the fuel cells that are electric power generating means.

Furthermore, there is not only the temporal mismatching but also a quantitative mismatching between supply and demand for electric power and heat in a co-generation system. For example, ratios of the demand for heat to demand for electric power (heat-to-power ratios) in a building differ between the summer season and the winter season. On the other hand, the heat-to-power ratio of fuel cells has almost remained constant regardless of the season.

Thus, it is probable that heat source devices using electric power are combined with devices that efficiently generate electric power using fuel cells and others and supply residual heat generated when the electric power is generated. It is desired that the heat pump technology is to become widespread for such heat source devices that use electricity for generating heat. Since the heat pumps use atmospheric heat and geothermal heat as heat sources at low temperatures, the atmospheric heat and geothermal heat are defined as renewable energies.

Here, PTL 1 discloses a method of making an operation plan for heat source devices, such as a co-generation system and a heat pump. PTL 1 relates to an operation planning system for energy supply equipment including a thermal storage tank. The operation planning system makes an operation plan for the heat source devices with the dynamic planning method, based on forecast on heat demand, as described in NPL 1. See PTL 3 as necessary.

CITATION LIST

Patent Literature

[PTL 1] Japanese Patent No. 3763767
[PTL 2] Japanese Unexamined Patent Application Publication No. 2001-355514
[PTL 3] Japanese Unexamined Patent Application Publication No. 2005-86953

Non Patent Literature

[NPL 1] Bakirtzis, A. G.; Dokopoulos, P. S., "Short term generation scheduling in a small autonomous system with unconventional energy sources", Power Systems, IEEE Transactions on, vol. 3, no. 3, pp. 1230 to 1236, August 1988

SUMMARY OF INVENTION

Since the demand for heat and demand for electric power are separately optimized (controlled) in the conventional technique or in combination with the conventional technique, for example, it is not possible to make a plan for converting surplus electric power of a solar power system into heat and storing the heat. As a result, when the stored electricity is later converted into heat using a heat source device, more excessive loss in discharged and charged electric power occurs than that in a case of directly converting the surplus electric power into heat and storing the heat. Furthermore, a secondary battery used in an electricity storage system has the life as long as the number of times the secondary battery has been charged and discharged. Thus, there is a possibility that the life of the storage battery might be shortened with increase in the unnecessary number of times the battery has been charged and discharged.

The present invention has been conceived in view of such circumstances, and has an object of providing a supply-and-demand control apparatus, a supply-and-demand control method, and a supply-and-demand control system that are capable of reducing the operating cost even when there are energy storage means for storing electricity, heat, and others.

In order to solve the problems, a supply-and-demand control apparatus according to an aspect of the present invention includes: an obtaining unit configured to obtain (i) power consumption of a device that operates using electric power and (ii) heat consumption of a device that operates using heat; a forecast unit configured to obtain demand forecast data on electric power and an amount of heat, using the obtained power consumption and the obtained heat consumption, respectively; a planning unit configured to calculate, for each point in time from a current time to a future time, an amount of electricity stored in an electricity storage device, an amount of heat stored in a heat storage device, and a control parameter for controlling operations of the electricity storage device and a heat source device that supplies heat to the heat storage device, by substituting the obtained demand forecast data into a predetermined function; a storage unit configured to store a control table in which each of the amount of electricity and the amount of heat is associated with the control parameter for each of the points in time from the current time to the future time, the amount of electricity, the amount of heat, and the control parameter being calculated by the planning unit; and a control unit configured to obtain current time information, and a current amount of stored electricity and a current amount of stored heat respectively from the electricity storage device and the heat storage device, to identify a target control parameter from the control table using the current time information, the current amount of stored electricity, and the current amount of stored heat that are obtained, and to control operations of the electricity storage device and the heat storage device based on the identified target control parameter, wherein the planning unit is configured to calculate the control parameters such that electric power generated by a predetermined power system is distributed to the electricity storage device and the heat source device.

With such a configuration, the operating cost can be sufficiently reduced even when there are energy storage means for storing electricity, heat, and others.

For example, it is possible to avoid the (large) loss in energy of surplus electric power, improve the use efficiency of the surplus electric power, and reduce the operating cost by storing heat obtained from the surplus electric power for a relatively long time (see after 7 a.m. around 7 p.m. in FIG. 6). Furthermore, the amount of surplus electric power can be appropriately divided into the first electric power for charging and the second electric power to be used for generating the remaining heat, with respective amounts of electric power.

BRIEF DESCRIPTION OF DRAWINGS

FIG. 3 illustrates an example of a control table according to Embodiment 1.

FIG. 7 illustrates an example of a control table in an energy supply-and-demand system.

FIG. 8 illustrates an example of a control table divided into tables, for each device.

FIG. 9 illustrates processes in a conventional operation plan.

DETAILED DESCRIPTION OF INVENTION

Figure 1:
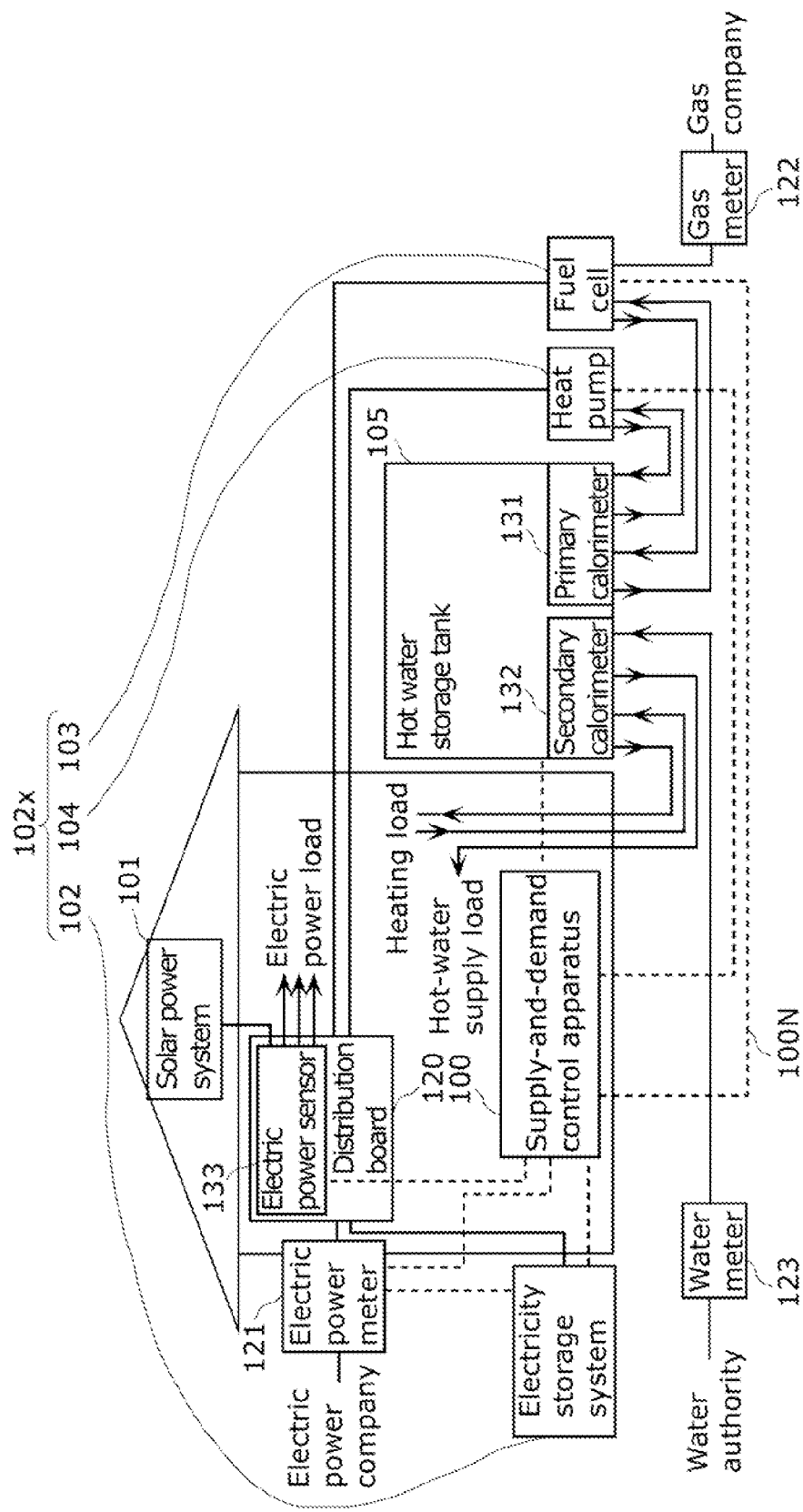
FIG. 1 illustrates a configuration of an energy supply-and-demand system according to Embodiment 1.

A supply-and-demand control apparatus 100 according to an embodiment of the present invention includes: an obtaining unit (obtaining unit 201g) configured to obtain (i) power consumption of a device that operates using electric power of an electricity storage device (electricity storage system 102) and (ii) heat consumption of a device that operates using heat of a heat storage device (hot water storage tank 105); a forecast unit (forecast processing unit 201h) configured to obtain demand forecast data on electric power and an amount of heat, using the obtained power consumption and the obtained heat consumption, respectively; a planning unit (supply-and-demand planning unit 200) configured to calculate, for each point in time from a current time to a future time, an amount of electricity stored in the electricity storage device (the second column in FIG. 7), an amount of heat stored in the heat storage device (the third column), and a control parameter (the fourth and fifth columns) for controlling operations of the electricity storage device and a heat source device (heat pump 104 and others) that supplies heat to the heat storage device, by substituting the obtained demand forecast data ($x_{0,t}$) into a predetermined function (U in Math. 10); a storage unit configured to store a control table (control table 203) in which each of the amount of electricity and the amount of heat is associated with the control parameter for each of the points in time from the current time to the future time, the amount of electricity, the amount of heat, and the control parameter being calculated by the planning unit; and a control unit (supply-and-demand control unit 204) configured to obtain current time information (time information 204t), and a current amount of stored electricity and a current amount of stored heat ($s_t$) respectively from the electricity storage device and the heat storage device, to identify a target control parameter ($u_t$) from the control table using the current time information, the current amount of stored electricity, and the current amount of stored heat that are obtained, and to control operations of the electricity storage device and the heat storage device based on the identified target control parameter, wherein the planning unit is configured to calculate the control parameters such that electric power generated by a predetermined power system (solar power system 101 installed in a house including the supply-and-demand control apparatus 100) is distributed to the electricity storage device and the heat source device.

Furthermore, at least one demand forecast data ($x_{0,t}$) to be calculated may be, for example, demand forecast data at a certain time for determining demand for heat having an amount larger than a threshold.

Figure 6:
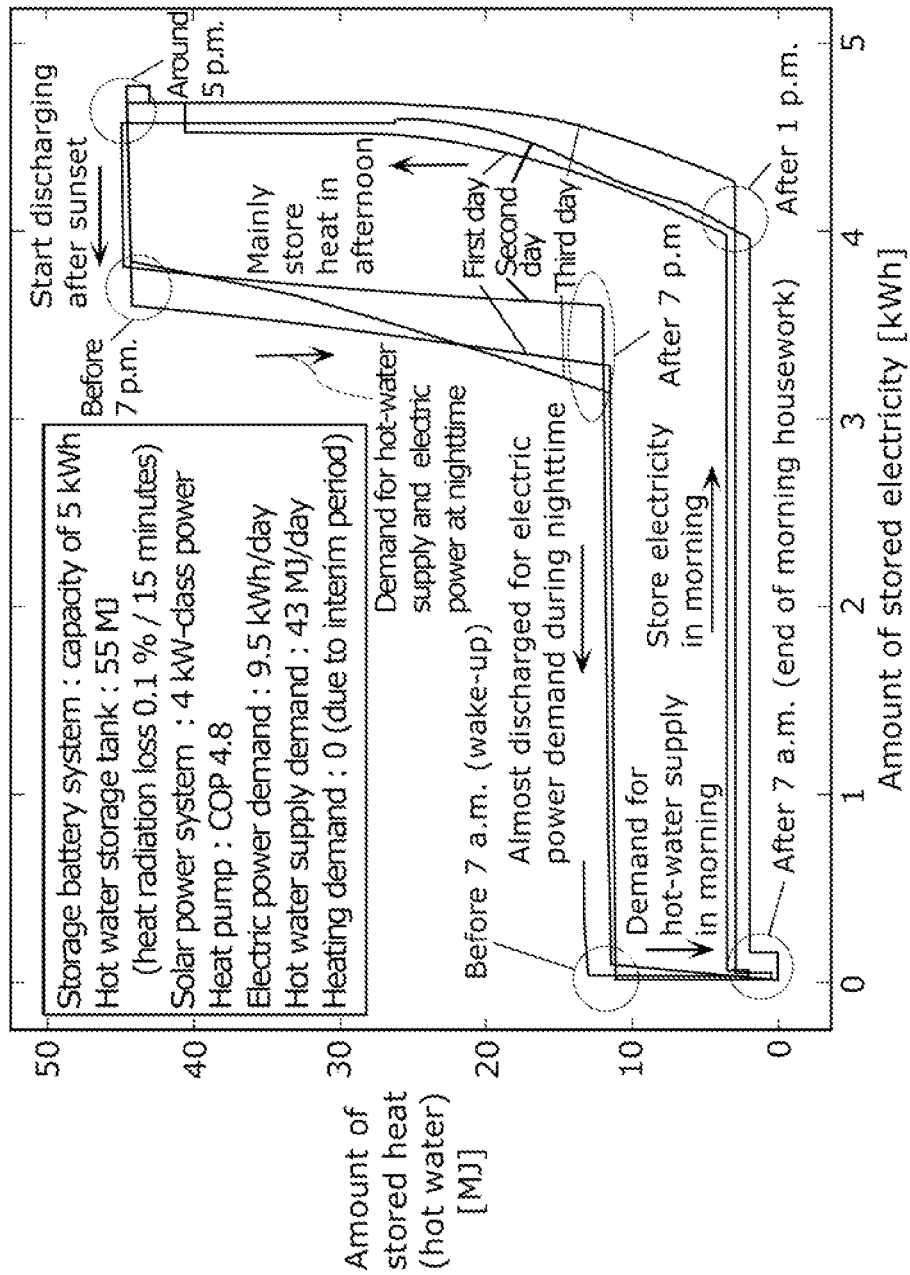
FIG. 6 illustrates a path of a vector $s_t$ according to Embodiment 2.

For example, the time of the demand forecast data may be determined as the time at which the heat having the larger amount (for example, the time with demand for hot-water supply at nighttime around 7. p.m. in FIG. 6) is demanded, by calculating the demand forecast data.

For example, a control parameter calculated for the time that is relatively recent past (for example, in the afternoon between 1 p.m. and 5 p.m. in FIG. 6) from the determined time may be a control parameter for generating heat using the surplus electric power (of a larger proportion than the first threshold).

With this respect, see also "Mainly store heat in afternoon" in FIG. 6.

Furthermore, a control parameter calculated for the time that is relatively distant past from the determined time (in the morning after 7 a.m. past 1 p.m, etc.) is, for example, a control parameter for not generating heat using (of a larger proportion of) the surplus electric power.

With this respect, see also "Store electricity in morning" in FIG. 6.

Thereby, heat is generated using (a larger proportion of) the surplus electric power, for example, from the time with the larger demand for heat (see the time with "Demand for hot-water supply") to the recent past (afternoon). Thereby, energy of surplus electric power can be sufficiently used, for example, as heat and for other purposes except for charging.

Thus, surplus electric power is rarely used for charging, and a failure using the surplus electric power, such as degradation in the electricity storage system 102, can be reduced.

Furthermore, heat is not generated using a large portion of the surplus electric power in the distant past (morning) from the time with the larger demand for heat. Thereby, it is possible to avoid the (large) loss in energy of surplus electric power by storing heat for a relatively long time (for example, after 7 a.m. before 7 p.m.) from the distant past (morning). Thereby, efficiency for using the surplus electric power can be increased.

Thereby, it is possible both to avoid the negative effect with less applications (degradation in the electricity storage system 102) and to increase the efficiency for using the surplus electric power.

The cost (operating cost of the supply-and-demand control system) can be reduced by increasing the efficiency for using the surplus electric power.

Here, the supply-and-demand control system may include the demand forecast unit 201 including the obtaining unit 201g and the forecast processing unit 201h.

Additionally disclosed is a supply-and-demand control apparatus (supply-and-demand control apparatus 100) including: a demand forecast unit (the demand forecast unit 201, S11 in FIG. 11) that obtains, for example, demand forecast data indicating demand for each of electric power and heat, for example, in a building; a supply-and-demand planning unit (the supply-and-demand planning unit 200, S13 in FIG. 11) that calculates, using the demand forecast data obtained by the demand forecast unit, control parameters (the fourth to fifth columns in FIG. 7 (the fifth to seventh columns in FIG. 3)) for controlling an energy device (energy device 102x (102y) or a part of the energy device 102x (102y)) that stores or supplies (performs control such that each energy storage is changed) each of an amount of stored electricity and an amount of stored heat that respectively correspond to an amount of electricity (electric power) (see the second column in FIG. 7 and others) stored in an electricity storage unit (the electricity storage system 102) and an amount of heat (the third column) stored in a heat storage unit (the hot water storage tank 105); and a control table (the control table 203, S14 in FIG. 11) that stores the control parameter (the fourth to fifth columns in FIG. 7) calculated by the supply-and-demand planning unit and corresponding to the amount of stored electricity and the amount of stored heat, using pairs of amounts of stored electricity and amounts of stored heat as indices (the second and third columns in FIG. 7).

Here, the energy device may belong to a group of energy devices (for example, an entire group of the electricity storage system 102, the heat pump 104, and the fuel cell 103), or may be a single device (for example, the heat pump 104).

The demand forecast unit may compute demand forecast data using data other than the demand forecast data, resulting in obtainment of the demand forecast data.

Furthermore, the demand forecast unit may obtain the demand forecast data with input of the data from outside of the demand forecast unit (for example, outside of the supply-and-demand control apparatus).

Thereby, the electricity storage unit (the first energy accumulating unit) may store (accumulate) the electric power (the first energy) by an amount (a first energy storage). Furthermore, the heat storage unit (the second energy accumulating unit) may store (accumulate) the heat (the second energy) by an amount (a second energy storage). Then, the energy device (the energy device 102x, 102y) performs control so as to change each energy storage. Here, "change" means at least one of increasing and reducing the energy storage. In addition, "increasing" means accumulating the amount according to the increase. In addition, "reducing" means supplying the energy to a supply destination.

Here, the recitation that the energy device "stores or supplies each of an amount of stored electricity and an amount of stored heat" means further accumulating the increased amount, increasing the energy storage, or reducing the energy storage by supplying the energy to a supply destination. In other words, "change" means changing each energy storage.

Then, the control parameter is calculated by the supply-and-demand planning unit, and is stored in a control table in association with an amount of stored electricity and an amount of stored heat, so that the control parameter is used for controlling two of the energy storages.

The demand forecast unit may compute demand forecast data using data other than the demand forecast data, resulting in obtainment of the demand forecast data, or obtain the demand forecast data with input of the data from outside of the demand forecast unit (for example, outside of the supply-and-demand control apparatus).

More specifically, the energy device (the energy device 102x, etc.) may include the electricity storage unit (the electricity storage system 102) that charges an electricity storage unit to increase an amount of stored electricity, and a heat source device that generates heat to increase an amount of heat stored in the heat storage unit, such as a heat pump (104) and a fuel cell (103).

Furthermore, the control parameters may include a first control parameter (the fourth column in FIG. 7) for determining an amount of charged electricity, and a second control parameter (the fifth column) for determining an amount of electric power used by a heat pump when the heat source device is the heat pump.

Then, the demand forecast unit may obtain demand forecast data for determining demand for each of electric power and heat in the building, and generate two of the first and second control parameters (the fourth and fifth columns in FIG. 7) corresponding to the amount of stored electricity and amount of stored heat, using the demand forecast data obtained by the demand forecast unit.

Furthermore, the control table may store correspondence (each column in FIG. 7) between the amount of stored electricity (the second column), the amount of stored heat (the third column), and the two control parameters corresponding to the amount of stored electricity and amount of stored heat (the fourth and fifth columns).

The supply-and-demand control apparatus may include a supply-and-demand control unit (204) that causes, with respect to the current amount of stored electricity and amount of stored heat, (i) the electricity storage unit to charge with an amount of charge indicated by the first control parameter (the fourth column) indicated by the correspondence stored in the control table and (ii) the heat pump to generate heat with the amount of electric power indicated by the corresponding second control parameter (the fourth column).

The second control parameter determines an amount of electric power to be used by the heat source device for generating heat.

More specifically, the heat source device may be at least one of a heat pump and a fuel cell.

Furthermore, the second control parameter may be one of the third control parameter (the seventh column in FIG. 3) and the fourth control parameter (the sixth column in FIG. 3) that corresponds to one of devices. The third control parameter determines the amount of electric power with which a heat pump generates heat, and the fourth control parameter determines the amount of electric power with which a fuel cell generates heat.

Furthermore, examples of the heat source device include both a heat pump and a fuel cell, and the second control parameter may include both of the third and fourth control parameters.

The supply-and-demand planning unit may generate two of the first and second control parameters (the fourth and fifth columns) for each of points in time (the first column in FIG. 7).

Furthermore, the control table may store correspondence (each column in FIG. 7) between the time (the first column) and the two of the first and second control parameters (the fourth and fifth columns) for each of the points in time.

Then, the supply-and-demand control unit may use the two of the first and second control parameters (the fourth and fifth columns) at the corresponding time (the first column) stored in association with the two control parameters in the correspondence.

Here, using "for the corresponding time" may mean using the control parameter at the time strictly identical to the corresponding time, or using the control parameter at the time closer to the corresponding time.

Embodiments of the present invention will be hereinafter described with reference to drawings.

Embodiment 1

FIG. 1 illustrates an example of a configuration of an energy supply system according to Embodiment 1.

The energy supply system is installed in buildings, such as a house and an office building. The electric power is supplied to a device that operates using electric power (electric power load), while two energies of electric power and hot water are supplied to a device that uses the hot water (hot-water supply load), such as a water heater, and to a device for heating using heat of the hot water (heating load).

The energy supply system in FIG. 1 includes a solar power system 101, an electricity storage system (storage battery system) 102, a fuel cell 103, a heat pump 104, and a hot water storage tank 105. Furthermore, the energy supply system includes a distribution board 120, an electric power meter 121, a gas meter 122, and a water meter 123. Furthermore, the energy supply system includes a supply-and-demand control apparatus 100 for efficiently operating these constituent elements.

The solar power system 101 is a system for generating electric power by directly converting solar energy into electrical energy. The generated electric power is supplied to the distribution board 120. Since the electrical power output is mainly determined by light energy generated by the sun, the supply-and-demand control apparatus 100 cannot control the electrical power output.

Here, the solar power system 101 includes, for example, a solar cell panel installed on a roof of a building and a power conditioner that converts DC power of the solar cell into AC power, which are not illustrated in FIG. 1.

The electricity storage system 102 charges the solar power system 101 when the electric power of the solar power system 101 exceeds the demand of the building, and discharges the solar power system 101 when the electric power of the building is lacking.

The electricity storage system 102 in FIG. 1 is connected to the distribution board 120, so that it can store not only the electric power of the solar power system 101 but also the electric power generated by the fuel cell 103 or the electric power supplied from an electric power company to the building.

The electricity storage system 102 may be a general electricity storage system. In general, methods of connecting an electricity storage system (electricity storage system 102) to a destination probably include a method of connecting it to the power conditioner of a solar power system (solar power system 101) on DC and a method of connecting it to a distribution board (distribution board 120) on AC.

The electricity storage system 102 uses a secondary battery, such as a lead accumulator or a lithium ion battery as a means to store the electricity in both cases of connecting to the power conditioner and the distribution board (distribution board 120). Since a charge and discharge current of the secondary battery is a direct current, when the electricity storage system 102 is connected to the distribution board (distribution board 120), it is necessary to provide a means that converts DC power into AC power, and vice versa, such as a bidirectional inverter.

The fuel cell 103 supplies the electric power and hot water, using the city gas supplied from a gas company as fuel. The electric power generated by the fuel cell 103 is supplied to the distribution board 120 as the electric power generated by the solar power system 101. The hot water storage tank 105 supplies water at a low temperature to a heat exchanger of the fuel cell 103. The fuel cell 103 generates electric power, and also hot water by collecting heat generated in generating the electric power, using the heat exchanger. Then, the fuel cell 103 returns the generated hot water to the hot water storage tank 105.

Since the operating temperature of the fuel cell 103 differs depending on an electrolyte material to be used, the water temperature to be returned to the hot water storage tank 105 differs depending on the system of the fuel cell 103. The operating temperature of a polymer electrolyte fuel cell that is expected to make the conventional houses widely available ranges between 80 to 100 degrees Celsius, and the temperature of hot water to be generated generally ranges between 60 to 70 degrees Celsius. Furthermore, in order to start generating electric power at a normal temperature, it is necessary to input energy and have operating time for heating.

The heat pump 104 absorbs heat from air that is a heat source at a low temperature, using a phenomenon that heat is absorbed when a refrigerant is expanded, and generates hot water using a heating phenomenon in compressing the refrigerant. As illustrated in FIG. 1, the heat pump 104 is connected to the distribution board 120. This is because the heat pump 104 uses electricity in compressing the refrigerant to generate heat. The hot water storage tank 105 supplies water at a low temperature to a heat exchanger included in the heat pump 104 and closer to the compressor, in the same manner as the fuel cell 103. Then, the heat pump 104 generates hot water by collecting heat generated in compressing the refrigerant, and returns the generated hot water to the hot water storage tank 105.

The hot water storage tank 105 temporarily stores the hot water generated by the fuel cell 103 and the heat pump 104. Then, the hot water storage tank 105 supplies the stored hot water when the electric power load or the heating load in a house needs hot water. The hot water storage tank 105 includes a primary calorimeter 131 that measures an amount of heat supplied from the fuel cell 103 and the heat pump 104, and a secondary calorimeter 132 that measures an amount of heat supplied to the electric power load and the heating load.

Although the hot water storage tank 105 includes a thermal storage tank that stores hot water, since there is heat radiation loss in the thermal storage tank, a difference in the measured amount of heat between the primary calorimeter 131 and the secondary calorimeter 132 does not match the amount of heat stored in the thermal storage tank. The hot water storage tank 105 is equipped with at least one temperature sensor at a position, in the thermal storage tank that stores hot water, and estimates an actual amount of stored heat based on information from the temperature sensor.

Many hot water storage tanks for houses where there is a limitation in space for installation use those of the temperature stratification type in which water at a low temperature and water at a high temperature are stratified and stored, using a difference in specific gravity between the temperatures.

In this case, water at a low temperature in the lower portion of the thermal storage tank is supplied to the fuel cell 103 and the heat pump 104 (primarily transmitted water), while the hot water returned from the fuel cell 103 and the heat pump 104 (primary hot water or the returned primary hot water) is stored in the upper portion of the thermal storage tank.

The amount of heat measured by the primary calorimeter 131 is an amount of heat of the returned primary hot water when the amount of heat from the primarily transmitted water is assumed to be zero. Thus, the primary calorimeter 131 generally includes multiple means, such as a water temperature meter that measures a water temperature of the primarily transmitted water, a water temperature meter that measures a water temperature of the returned primary hot water, a flow meter that measures a volume of the water, and a computing unit that computes an amount of heat from the measured value.

The hot water in the upper portion of the thermal storage tank (secondary hot water or secondarily transmitted water) is supplied to the electric power load, and the same amount of running tap water (city water) is replenished to the lower portion of the thermal storage tank.

Since the heating load needs only heat from hot water, the hot water in the upper portion of the thermal storage tank (secondary hot water or secondarily transmitted water) is supplied to the heat exchanger, and the cooled water obtained by discharging heat by the heat exchanger (the returned secondary water) is returned to the lower portion of the thermal storage tank.

The amount of heat measured by the secondary calorimeter 132 is an amount of heat of the secondarily transmitted water when the amount of heat of the city water or the returned secondary water is assumed to be zero.

The distribution board 120 includes a breaker necessary for safely using electricity. The distribution board 120 supplies electric power to the electric power load. Furthermore, the distribution board 120 includes an electric power sensor 133. The electric power sensor 133 measures each of power consumption of the electric power load and the electrical power output of the solar power system 101 that are not controllable by the supply-and-demand control apparatus 100.

The supply-and-demand control apparatus 100 may forecast, as an electric power demand, a value obtained by subtracting the electrical power output of the solar power system 101 from power consumption of the electric power load, which will be described later. The forecast is possible because forecast data to be used for supply-and-demand planning may be limited to an amount of the electric power demand that cannot be covered by the electrical power output of the solar power system 101 or an amount of surplus electric power, according to Embodiment 1. Thus, the electric power sensor 133 may measure only a difference between the power consumption of the electric power load and the electrical power output of the solar power system 101.

The electric power meter 121, the gas meter 122, and the water meter 123 measure an amount of electric power, an amount of city gas, and an amount of running tap water purchased from an electric power company, a gas company, and a water authority, respectively.

Here, a product of a measured value and a unit price or a $CO_2$ emission coefficient, etc. is equal to an operating cost (economic cost, environmental cost) of a building. The main object of the supply-and-demand control apparatus 100 is to reduce the operating cost.

The supply-and-demand control apparatus 100 forecasts the demand for two energies of electric power and hot water after the current time, using the past demand data obtained from the electric power sensor 133 of the distribution board 120 and the secondary calorimeter 132 of the hot water storage tank 105, respectively. The electric power is forecasted by subtracting the electrical power output of the solar power system 101.

Furthermore, the supply-and-demand control apparatus 100 obtains the price of electricity from the electric power meter 121 when the price dynamically fluctuates.

Furthermore, the supply-and-demand control apparatus 100 obtains an energy storage of electricity from the electricity storage system 102 and an energy storage of hot water from the hot water storage tank 105, and obtains an operating state of the fuel cell 103 from the fuel cell 103.

The supply-and-demand control apparatus 100 controls the electricity storage system 102, the fuel cell 103, and the heat pump 104 for controlling the electrical power output, the power consumption, operating and/or stop, and others at regular intervals, using the obtained information.

Figure 2:
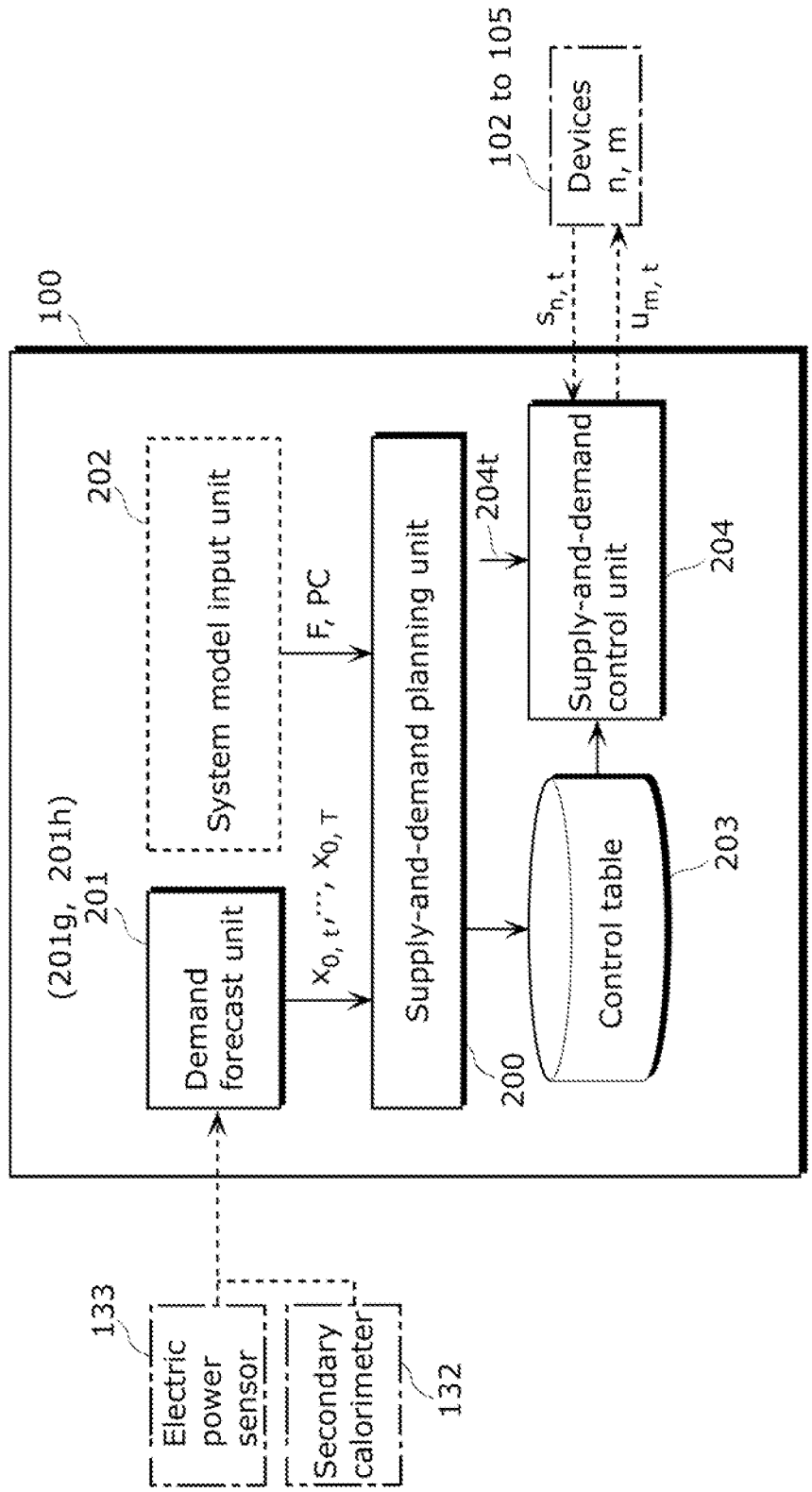
FIG. 2 illustrates a configuration of an supply-and-demand apparatus according to Embodiment 1.

FIG. 2 illustrates a configuration of the supply-and-demand control apparatus 100.

The supply-and-demand control apparatus 100 includes a supply-and-demand planning unit 200, a demand forecast unit 201, a system model input unit 202, a control table 203, and a supply-and-demand control unit 204.

An entire or a portion of the supply-and-demand control apparatus 100 is, for example, a computer including a CPU, a RAM, and a ROM. It may be understood that each of the constituent elements, such as the supply-and-demand planning unit 200 is a functional block with a function to be implemented by the supply-and-demand control apparatus 100 by causing the computer to execute a program.

Figure 11:
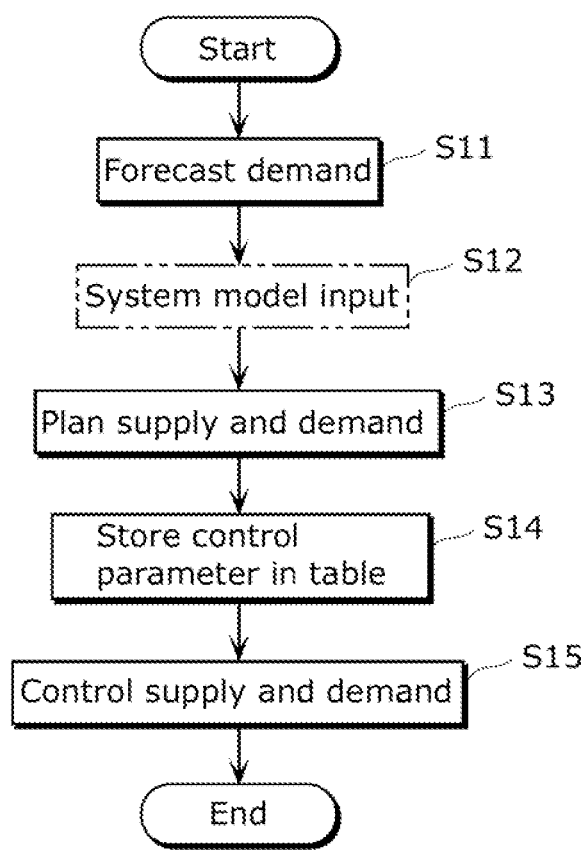
FIG. 11 illustrates a flowchart of the supply-and-demand control apparatus.

The demand forecast unit 201 forecasts an energy demand at each point in time from the current time t to a time T after a predetermined duration, using the obtained past demand data (S11 in FIG. 11). Then, the demand forecast unit 201 provides the forecasted energy demand to the supply-and-demand planning unit 200.

There are many forecasting methods. Among them, PTL 2 discloses a method using a regression model. In other words, the demand forecast unit 201 may determine (calculate) an energy demand, for example, in a method of computing a demand forecast using the regression model.

The demand forecast unit 201 may determine an energy demand using other methods. The other methods may include a known method, a common method, a method easily conceived by a person skilled in the art, and a method to which a further improved invention is applied. For example, energy consumption (electric power, etc.) may be determined for a day prior to a day with the energy demand to be calculated. The demand for energy consumption identical to that for the prior day may be determined as the energy demand of the calculation day.

The system model input unit 202 generates a system function for representing a behavior of the energy supply system and a cost function for calculating an operating cost, and provides the supply-and-demand planning unit 200 with each of the system function and the cost function that are generated (S12 in FIG. 11). The system model input unit 202 may hold the system function and others therein in advance, prior to the input of the system function to the supply-and-demand planning unit 200. The details of the system function and the cost function will be described later.

The supply-and-demand planning unit 200 uses the demand forecast provided by the demand forecast unit 201 and the system function provided by the system model input unit 202.

Then, the supply-and-demand planning unit 200 simulates an operation of the energy supply system using the demand forecast and the system function. More specifically, the supply-and-demand planning unit 200 calculates a control parameter of each device until a future time so that the value of the cost function provided from the system model input unit 202 to the supply-and-demand planning unit 200 is the smallest.

Then, the supply-and-demand planning unit 200 stores the calculated control parameter in the control table 203 (S13 in FIG. 11). The details of the principle and the operation of the supply-and-demand planning unit 200 will be described later.

The control table 203 holds a result calculated by the supply-and-demand planning unit 200 (S14 in FIG. 11).

The control parameter to be set to each device depends on a time (the first column in FIG. 3), the energy storage at the time (an amount of electricity stored in the second column, an amount of heat stored in the third column), and an operating state of the device (the fourth column).

The time, the energy storage, and the operating state of the device are discretized, and the pair of these is assumed to be an index, and a control parameter corresponding to the index is stored in the control table 203.

FIG. 3 illustrates an example of the control table 203.

The supply-and-demand control unit 204 obtains energy storage (the second and third columns) and an operating state (the fourth column) from each of the devices, with a time step stored in the control table 203 or a time step shorter than the time step. Then, the supply-and-demand control unit 204 identifies a control parameter to be set, based on the obtained information and the current point in time with reference to the control table 203.

When an identified control parameter indicates a value different from a value currently set to each of the devices, the identified control parameter is set to each of the devices as a new control parameter (S15 in FIG. 11).

The appropriate control parameter depends on a time, the energy storage, and an operating state of the device. However, a temporal difference between two times with a time step in planning supply and demand is trivial and may be neglected. The time step (width of the step) in planning the supply and demand is probably made larger by updating the control parameters with reference to the energy storage, the operating state of the device, and the control table 203, with an interval shorter than the time step in planning the supply and demand. In other words, when a planned amount in planning the supply and demand is to be reduced by increasing the width of the time step in planning the supply and demand, with a shorter interval of the reference and updating thereof, the influence on the operating cost can be reduced.

In other words, only an appropriate control parameter at a point in time is stored with the time step in planning the supply and demand, and the control parameter is used at other times with the time steps. Thereby, the computing amount can be reduced. In contrast, the width of the time step in planning the supply and demand is sufficiently small. Thus, a difference between the appropriate control parameter at a point in time and another appropriate control parameter at another point in time is so small that the appropriate control parameter can be regarded as substantially the same as the other appropriate control parameter. Thus, a control parameter regarded as appropriate is used at another point in time. Thus, high performance can be maintained by, for example, avoiding the decrease in the operating cost. Thereby, maintaining high performance and ease in processing can become mutually compatible.

Figure 4:
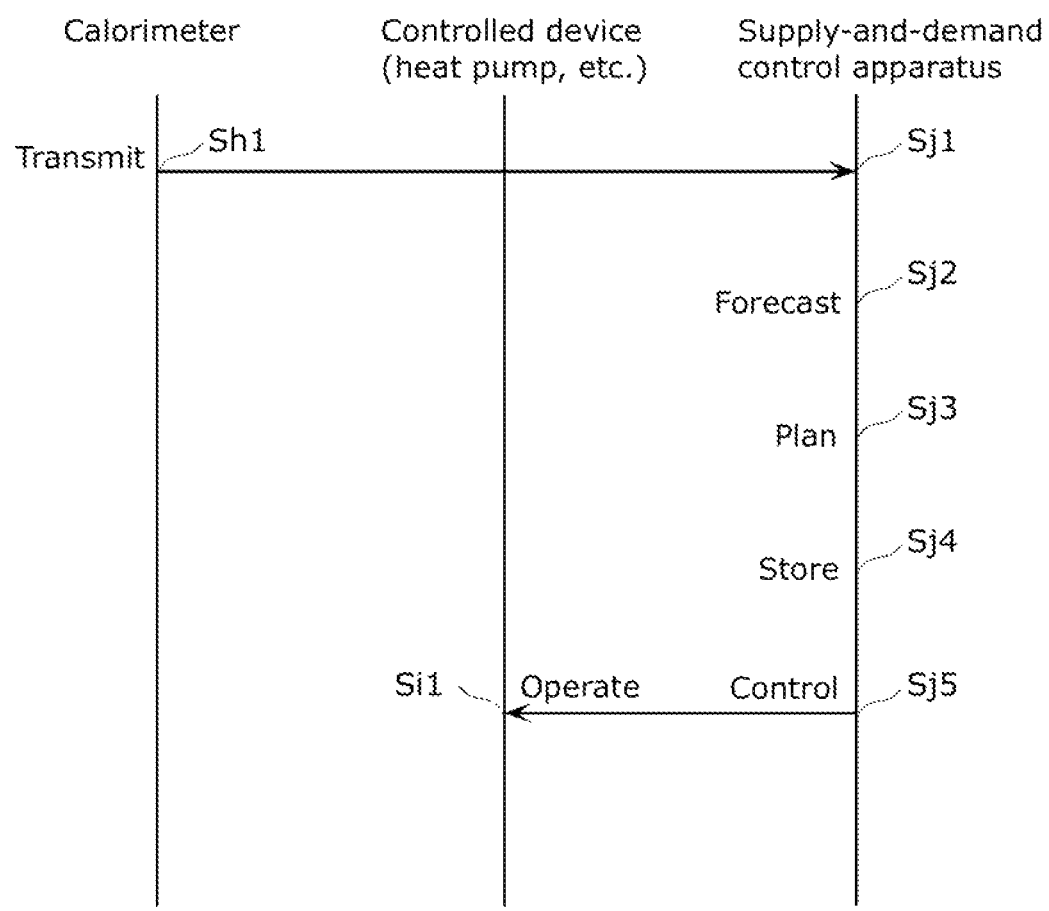
FIG. 4 is a sequence diagram of processes performed in the energy supply-and-demand system according to Embodiment 1.

FIG. 4 is a sequence diagram of processes according to Embodiment 1.

At Sh1, information on power consumption and heat consumption is transmitted, and at Sj1, the supply-and-demand control apparatus 100 receives the transmitted information. At Sj2, the supply-and-demand control apparatus 100 generates demand forecast data using the received information. At Sj3, the supply-and-demand control apparatus 100 generates a control parameter based on the generated demand forecast data. At Sj4, the supply-and-demand control apparatus 100 stores the generated control parameter in the control table 203. At Sj5, the supply-and-demand control apparatus 100 transmits the stored control parameter and performs control using the control parameter. At Si1, the heat pump 104 and others subject to the control perform operations, based on the control to be performed.

Next, the system function and cost function generated or held by the system model input unit 202 will be described.

Here, in order to simplify the notation in equations, a device that stores energy and a device that needs energy for operating (N=3 in FIG. 1, namely, the electricity storage system 102, the hot water storage tank 105, the fuel cell 103) are denoted as devices n ($1 \leq n \leq N$) in the energy supply system.

Then, devices controllable by the supply-and-demand control apparatus 100 (M=3 in FIG. 1, namely, the electricity storage system 102, the fuel cell 103, and the heat pump 104) are denoted as devices m ($1 \leq m \leq M$). Each of the system function and the cost function is a function of discrete time.

The system function is a function for representing a behavior of the energy supply system.

More specifically, the system function is a function for calculating an amount of stored energy and an operating state (that is, $s_{t+1}$) at the end of a time step (that is, at the start of the time step of the time (t+1)), using an amount of stored energy and an operating state of the device that needs energy for operating ($s_t$), the control parameter to be provided to each of the devices ($u_t$), and a demand forecast value at the time t ($x_{0,t}$), at the start of the time step of the time t.

For example, the system model input unit 202 calculates a system function F, using the configuration of the energy supply system and the behavioral model of a device included in the configuration. Furthermore, the system function F may be calculated through learning from data that has been actually operated, or be held in advance.

Although the system function F is denoted by the following equation in order to simplify the notation hereinafter, the supply-and-demand planning unit 200 may receive a subroutine for calculating F (·).

$$s_{t+1} = (s_t, u_t, x_{0,t}) \quad \text{[Math. 1]}$$

Here, the vector $s_t$ ($s_{t+1}$) uses a value of an amount of stored energy or an operating state $s_{n,t}$ ($s_{n,t+1}$) as an element at the start of the time step of the discrete time t (t+1) in the devices n ($1 \leq n \leq N$) that store energy or need energy for operating.

In other words, a state of each of the devices n (amount of stored electricity, amount of stored heat, operating/stop) at the time i (=t, t+1) is represented by the value $s_{n,i}$.

Then, the vector $s_1$ represents an entire state of each of the N devices n (device 1, device 2, . . . , device N) in the energy supply system ($1 \leq n \leq N$).

$$s_t = (s_{1,t}, s_{2,t} \ldots s_{N,t}) \quad \text{[Math. 2]}$$

The vector $u_t$ uses a control parameter $u_{m,t}$ of the devices m controllable by the supply-and-demand control apparatus 100 at the time t, as an element.

$$u_t = (u_{1,t}, u_{2,t} \ldots u_{M,t}) \quad \text{[Math. 3]}$$

The vector $x_{0,t}$ uses a demand forecast value obtained by the demand forecast unit 201 for each supplied energy at the time t as an element. Thus, since the entire forecast data to be provided from the demand forecast unit 201 to the supply-and-demand planning unit 200 includes the vector at the corresponding time, the data is denoted by the following vector sequence (Math. 4).

$$x_{0,t}, x_{0,t+1}, \ldots, x_{0,T} \quad \text{[Math. 4]}$$

The cost function is a function for calculating an operating cost with a time step, using an amount of stored energy, an operating state of the devices ($s_t$), the control parameter to be provided to each of the devices ($u_t$), and a forecast value of energy demand at the time t ($x_{0,t}$), at the start of the time step of the time t.

The system model input unit 202 calculates a cost function PC, using the configuration of the energy supply system, the energy consumption model of the devices included in the configuration, and the rate sheet of an electric power company or a gas company. Although the cost function is denoted by the symbol "PC" below, the system model input unit 202 may provide a subroutine for calculating PC (·) to the supply-and-demand planning unit 200.

$$PC(s_t, u_t, x_{0,t}, t) \quad \text{[Math. 5]}$$

The operating cost calculated using the cost function may be not an economic cost but an environmental cost. In this case, not the rate sheet but a $CO_2$ emission coefficient and others are used. Furthermore, when a battery is almost fully charged and is further recharged, the degraded life of the battery may be added to the operating cost.

Examples of how to set parameters of a system function and a cost function will be described below.

Here, an amount of electricity stored in the electricity storage system 102 at the time t is assumed to be $s_{1,t}$. Furthermore, an amount of heat stored in the hot water storage tank 105 is assumed to be $s_{2,t}$. The control parameter to be provided to a storage battery system (charged amount per unit time, electrical discharge when the parameter indicates a negative value) is assumed to be $u_{1,t}$. Furthermore, the control parameter to be provided to a fuel cell (electrical power output per unit time) is assumed to be $u_{2,t}$. Furthermore, the control parameter to be provided to a heat pump (power consumption per unit time) is assumed to be $u_{3,t}$. The demand forecast of electricity obtained by subtracting the electrical power output by the solar power system 101 is assumed to be $x^{elec}_{0,t}$. Furthermore, the demand forecast of heat is assumed to be $x^{heat}_{0,t}$. Thus, Math. 6 can be denoted as follows.

$$s_{1,t+1} = s_{1,t} + u_{1,t}$$

$$s_{2,t+1} = s_{2,t} + R \cdot u_{2,t} + C \cdot _{3,t} - x^{heat}_{0,t} \quad \text{[Math. 6]}$$

Here, R denotes a heat-to-power ratio of the fuel cell (obtained by dividing an amount of collected heat per unit time by the electrical power output), and C denotes Coefficient Of Performance (COP) of the heat pump. For simplification, either of them is a constant, and the operating time and the operating loss of each of the devices are assumed to be neglected.

Thus, Math. 7 can be denoted as follows.

$$PC(s_t, u_t, x_{0,t}, t) = (u_{1,t} + x^{elec}_{0,t}) \cdot L + u_{2,t} \cdot M \quad \text{[Math. 7]}$$

L denotes the price of electricity, and M denotes the cost of generating electric power by a solar cell (obtained by dividing the price of gas by power generation efficiency). They are assumed to be constants for simplification.

The parameter to be set may be, for example, not a parameter set in the aforementioned method but a parameter set in a method other than the aforementioned method.

In other words, the other methods may include, for example, a known method, a common method, a method easily conceived by a person skilled in the art, and a method to which a further improved invention is applied.

Next, the principle of supply-and-demand planning according to Embodiment 1 will be described. First, assuming that the vector $s_t$ denotes the energy storage at the time t and operating states of devices, the smallest value TC (t, $s_t$) of the cost generated from the time t to the time T (t<T) is expressed as follows.

$$TC(t, s_t) = \min_{u_t, u_{t+1}, \ldots, u_T} \sum_{i=t}^{T} PC(s_i, u_i, x_{0,i}, i) \quad \text{[Math. 8]}$$

The above equation can be modified into a recurrence formula as below, based on Bellman's principle of optimality. Using the recurrence formula, the supply-and-demand planning unit 200 can generate the control table 203.

$$\begin{aligned} TC(t, s_t) &= \min_{u_t} \left\{ PC(s_t, u_t, x_{0,t}, t) + \min_{u_{t+1}, \ldots, u_T} \sum_{i=t+1}^{T} PC(s_i, u_i, x_{0,i}, i) \right\} \\ &= \min_{u_t} \{ PC(s_t, u_t, x_{0,t}, t) + TC(t+1, s_{t+1}) \} \\ &= \min_{u_t} \{ PC(s_t, u_t, x_{0,t}, t) + TC(t+1, F(s_t, u_t, x_{0,t}, t)) \} \end{aligned} \quad \text{[Math. 9]}$$

Operations of the supply-and-demand planning unit 200 will be hereinafter described. The supply-and-demand planning unit 200 provides a table for TC on a memory, and initializes TC (T+1, $s_{T+1}$) to 0. Then, TC (·) is calculated using the recurrence formula from the time T to T−1, T−2, . . . ,t+1, and t.

Figure 12:
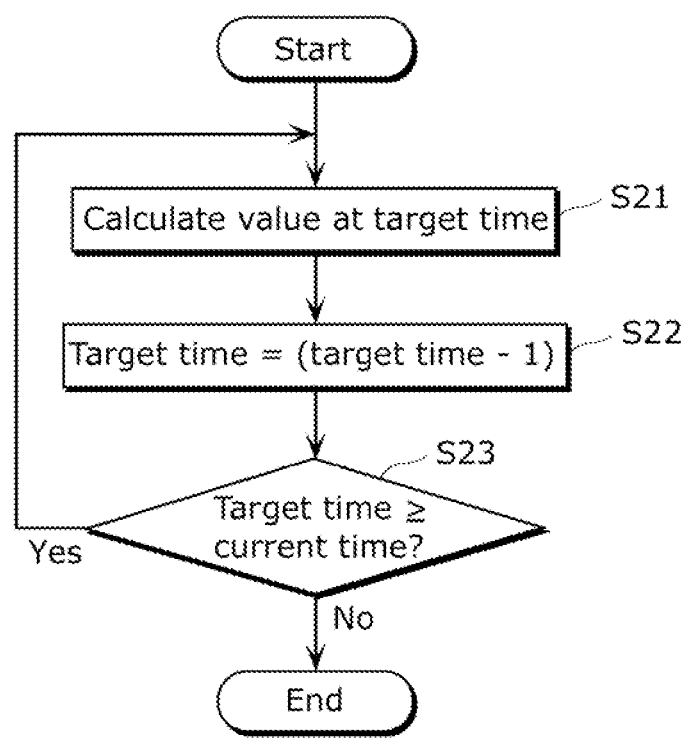
FIG. 12 illustrates a flowchart for calculating a control parameter.

Furthermore, assuming that the control table 203 as U(t, $s_t$), the supply-and-demand planning unit 200 sets the below value to the control table 203 simultaneously when TC (·) is calculated (Yes at 521, 522, and S23 in FIG. 12).

$$U(t, s_t) = \operatorname*{argmin}_{u_t} \{ PC(s_t, u_t, x_{0,t}, t) + TC(t+1, F(s_t, u_t, x_{0,t}, t)) \} \quad \text{[Math. 10]}$$

The symbol "$\min_{u_t}$" at the right side in Math. 9 denotes the smallest value when $u_t$ that minimizes the right side of the symbol (inside of the curly bracket) is given.

Furthermore, "$\operatorname{argmin}_{u_t}$" at the right side in Math. 10 denotes the value of $u_t$ that gives the smallest value.

Here, in order to store a result of calculation in an array of TC (T+1, $s_t$), U (T+1, $s_t$), it is necessary to discretize the value of the vector $s_t$. The elements of the vector $s_t$ may be evenly divided, or a method of efficiently discretizing the multi-dimensional vector space, such as tile coding, may be used. Furthermore, when F(·) and PC(·) cannot be given by the linear model or a convex function, the control parameter $u_t$ is also discretized, and F(·) and PC(·) are calculated using the combination of the linear model and the convex function. Furthermore, without setting the value of the TC (T+1, $s_{T+1}$) to be initialized to 0, the value of energy and the operating state stored at the end of the time step of the time T may be estimated (a smaller value indicates a higher value).

Embodiment 2

Figure 5:
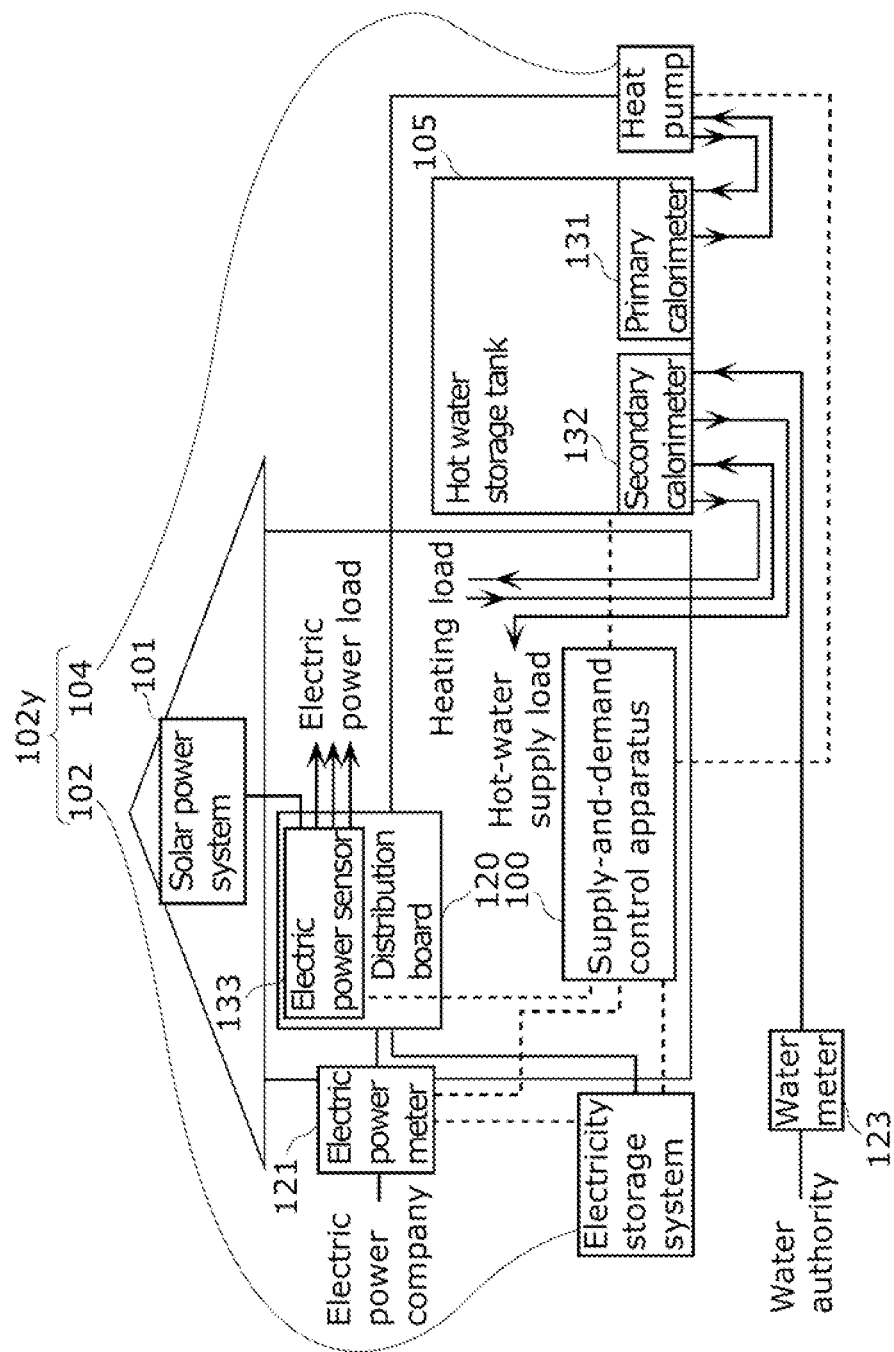
FIG. 5 illustrates an example of an overall configuration of an energy supply system according to Embodiment 2.

FIG. 5 illustrates an example of a configuration of an energy supply system according to Embodiment 2. The energy supply system according to Embodiment 2 differs from that according to Embodiment 1 by having no fuel cell 103 that exists in FIG. 1. Here, an energy device 102y includes an electricity storage system 102 and a heat pump 104.

According to Embodiment 1, the vector $s_t$ is a three-dimensional vector representing an amount of stored energy, an amount of stored heat, and an operating state of a fuel cell (see the second to fourth columns in FIG. 3). According to Embodiment 2, the vector $s_t$ is a two-dimensional vector representing an amount of stored energy and an amount of stored heat because no fuel cell exists (see the second to third columns in FIG. 7).

In this case, a path of the two-dimensional vector is easily illustrated. Here, FIG. 6 illustrates the path of the two-dimensional vector with the electricity stored in the horizontal axis and the amount of heat stored in the vertical axis, according to Embodiment 2.

FIG. 6 illustrates a result of a simulation by a computer on the progression of an amount of stored electricity and an amount of stored heat for three days when the energy supply system in FIG. 5 supplied the electricity and the heat, based on the demand measured in March in a Japanese household of five family members (9.5 kWh/day of electric power demand, 43 MJ/day of hot water supply demand).

March is an interim period between a heating period and a cooling period, and is a period in which air conditioners are rarely needed.

Here, the solar power system outputs 4 kW-class power (an average electrical power output per day is approximately 4 kW×12%×24 h=11.52 kWh). The storage battery system has a capacity of 5 kWh. The hot water storage tank has a capacity of 55 MJ or equivalent, with 0.1% of heat radiation loss for each 15 minutes. The COP of the heat pump is 4.8.

The surplus electric power generated by the solar power system 101 in any day during the three days was stored by the electricity storage system 102 in the morning. Then, in the afternoon, the power was converted into hot water, and the heat was stored in the hot water storage tank 105.

Then, after sunset, the electricity and hot water stored using the electric power of the solar power system 101 were used as the electric power for family getting together and supplying hot water for taking a bath.

Since the electricity storage system 102 stored the surplus electric power generated by the solar power system 101 in advance and later stored the heat, the heat radiation loss generated until the large hot water supply demand was minimized.

In contrast, conventionally, the electricity storage system 102 can only store the surplus electric power of the solar power system 101, and the heat pump 104 can only store the heat by operating using the midnight power and others.

FIG. 6 illustrates that the surplus electric power of the solar power system 101 is optimally distributed as the stored electricity and the stored heat, and that the present invention achieves the object of the optimal distribution.

FIG. 7 illustrates an example of a control table 203 of an energy supply-and-demand system (Embodiment 2) in FIG. 5.

As illustrated in FIG. 8, the control table 203 may be divided into tables (tables 203a, 203b) for each device.

In the conventional dynamic programming, generated operating costs are added up through a simulation in an ordinary temporal direction as illustrated in (a) of FIG. 9. Next, the operation plan is fixed (backtracked) by tracing a path in a direction opposite to the temporal direction such that the operating costs are the smallest. Thus, when the fixed operation plan is different from the energy storage at the current time as illustrated in (b) of FIG. 9, the operation plan needs to be made again, starting from an energy storage at that is time.

Figure 10:
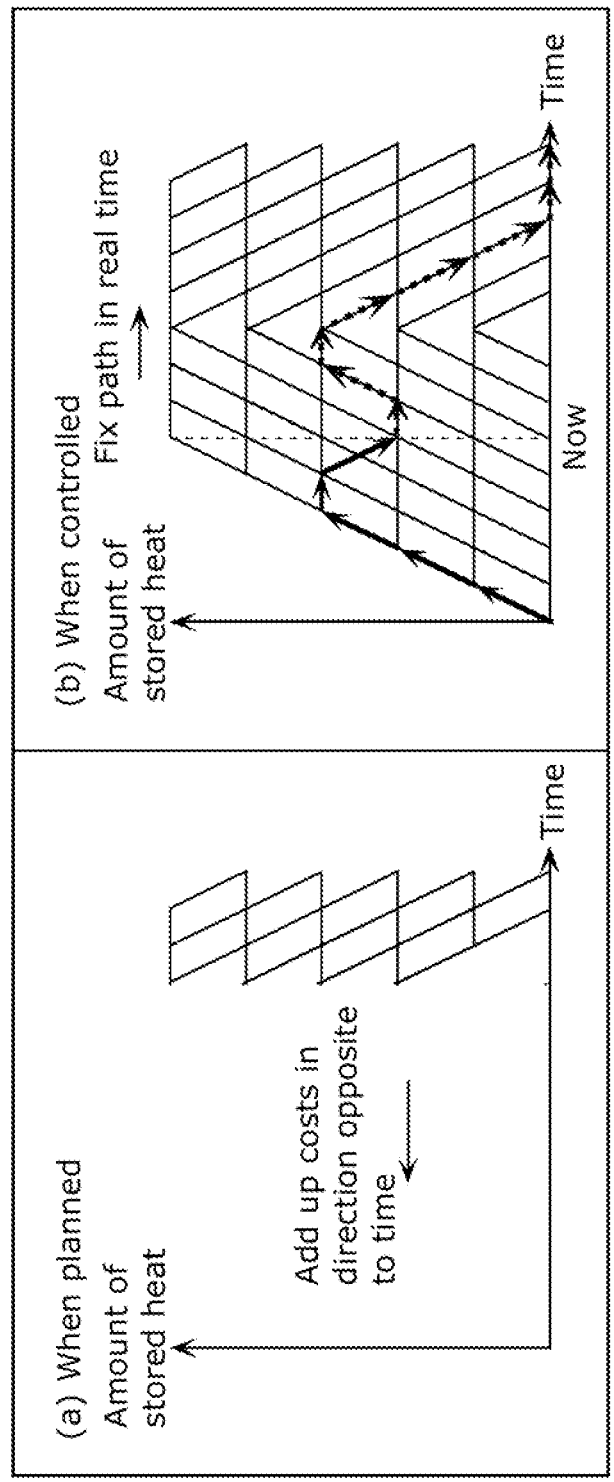
FIG. 10 illustrates processes in an operation plan of a supply-and-demand control apparatus according to the present invention.

According to the method performed by the supply-and-demand control apparatus of the present invention, the operating costs generated after the current time are added up through a simulation by progressing in the opposite direction in time as illustrated in (a) of FIG. 10 based on Math. 9.

At the same time, the control parameter with which the operating costs generated after the current time are the smallest is stored in the control table 203 for each energy storage (operating state of each device) at each point in time based on Math. 10.

Here, the process equivalent to the conventional backtracking is performed in real time. Thus, even when the planned demand is different from the actual demand, there is no need to add up costs again, and the control table 203 has only to be referred to based on the actual storage.

In other words, the supply-and-demand control apparatus 100 is included in the energy supply system.

The energy supply system includes the solar power system 101 that generates surplus electric power in a building, the electricity storage system 102 that stores a part of the generated surplus electric power, and heat source devices (the fuel cell 103 and the heat pump 104) that generate heat stored in the hot water storage tank 105, using electric power.

The energy supply system is, for example, a system in the Home Energy Management System (HEMS). Here, the HEMS is a system for which the technical development has been currently underway. The supply-and-demand control apparatus 100 may be an entire or part of a control device of the HEMS.

However, storing energy of surplus electric power using electricity could lead to, such as a loss in electric power in charging and discharging, degradation in the electricity storage system 102, and a failure in storing the electricity over the limit.

Thus, the supply-and-demand control apparatus 100 includes a supply-and-demand planning unit 200 and a supply-and-demand control unit 204 (FIG. 2). Thereby, when surplus electric power is generated, the supply-and-demand planning unit 200 does not store the generated surplus electric power in the electricity storage system 102 but supplies it to the heat source devices, and generates a control parameter (see the fifth column in FIG. 7) for causing the heat source devices to use the supplied surplus electric power. Then, the supply-and-demand control unit 204 uses the generated control parameter for causing the heat source devices to use the supplied surplus electric power.

Thereby, it is possible to avoid storing of surplus electric power, and various negative effects, such as the loss in electric power caused by the storing of the surplus electric power.

More specifically, the supply-and-demand planning unit 200 may determine an amount of surplus electric power (the fifth column in FIG. 7) corresponding to an amount of electricity stored in the electricity storage system 102 (the second column) and an amount of heat stored in the hot water storage tank 105 (the third column), and generate the control parameter for supplying the determined (amount of the) surplus electric power to the heat source device.

Then, the supply-and-demand control unit 204 may operate based on the correspondence between an amount of stored electricity, an amount of stored heat, and a control parameter corresponding to the amount of stored electricity and the amount of stored heat (each line in FIG. 7). The correspondence is stored in the control table 203. In other words, a control parameter indicated by the stored correspondence may be used based on the correspondence with respect to the current amount of stored electricity and amount of stored heat.

More specifically, for example, the supply-and-demand planning unit 200 may generate a control parameter for causing a heat source device to supply a larger surplus electric power, as a control parameter (the fifth column in FIG. 7) corresponding to a larger amount of stored electricity (the second column). In other words, as an amount of stored electricity is larger, a larger amount of surplus electric power may be used for generating heat. Thus, when an amount of stored electricity is sufficiently larger, a larger amount of heat is generated, so that a sufficient amount of electricity and a sufficient amount of heat can be reliably stored.

Furthermore, the supply-and-demand planning unit 200 may generate a control parameter for causing a heat source device to supply a smaller surplus electric power, as a control parameter (the fifth column) corresponding to a larger amount of stored heat (the third column). In other words, as an amount of stored heat is larger, a smaller amount of surplus electric power may be used for generating heat. Thus, when an amount of stored heat is sufficiently larger, a larger amount of electricity is stored, so that a sufficient amount of electricity and a sufficient amount of heat can be reliably stored.

More specifically, the supply-and-demand planning unit 200 may generate a control parameter (the fifth column) for each of points in time (the first column in FIG. 7). Then, the correspondence between the points in time and the respective control parameters may be stored in the control table 203. Then, the supply-and-demand control unit 204 may use the control parameter at the corresponding point in time that are indicated in the stored correspondence.

More specifically, the supply-and-demand planning unit 200 may perform the next operations.

More specifically, the operations may be performed at the time (the first column in FIG. 7) corresponding to a control parameter (the fifth column), that is, when the time at which surplus electric power is generated is not closer to the time at which heat generated using the surplus electric power is used (for example, after sunset in FIG. 6), that is, in the morning in FIG. 6.

In other words, in such a case, the control parameter for causing a heat source device not to use (an amount larger than a predetermined amount of) the surplus electric power when the surplus electric power is not used soon (see the annotation "storing electricity in morning") may be generated.

When the surplus electric power is used soon (afternoon in FIG. 6), the supply-and-demand planning unit 200 may generate a control parameter for causing a heat source device to use (an amount larger than a predetermined amount of) the surplus electric power (see the annotation "mainly store heat in afternoon").

More specifically, the supply-and-demand control apparatus 100 includes the supply-and-demand planning unit 200 and the supply-and-demand control unit 204. The supply-and-demand planning unit 200 determines that surplus electric power is to be generated, and generates the second control parameter such that the generated surplus electric power is used for generating heat (the fifth column in FIG. 7). Then, the supply-and-demand control unit 204 uses the generated second control parameter such that the generated surplus electric power is used for generating heat.

More specifically, the supply-and-demand planning unit 200 may determine an amount of electric power to be used for generating heat (the fifth column) out of the total amount of the generated surplus electric power, and generate the second control parameter (the fifth column) such that the second surplus electric power (the fifth column) having the determined amount is used for generating heat. Here, the second surplus electric power is electric power only having the determined amount of electric power out of the total surplus electric power including, for example, the second surplus electric power and the first surplus electric power only having the remaining amount of electric power (the fourth column). The supply-and-demand control unit 204 uses the generated second control parameter such that the second surplus electric power may be used for generating heat.

Here, the supply-and-demand planning unit 200 may generate the second control parameter indicating an determined amount of electric power. The supply-and-demand control unit 204 may allow the electric power only having an amount indicated by the generated second control parameter out of the total amount of surplus electric power to be used as the second surplus electric power for generating heat.

Then, the supply-and-demand planning unit 200 may determine an amount of electric power corresponding to the amount of electricity stored in the electricity storage system 102 (the second column in FIG. 7) and the amount of heat stored in the hot water storage tank 105 (the third column), as the amount of the second surplus electric power (the fifth column). Then, the supply-and-demand control unit 204 may allow the second surplus electric power to be used for generating heat using the generated second control parameter, when the current amount of stored electricity and amount of stored heat are respectively identical to the basic amount of stored electricity and amount of stored heat with which the amount of the second surplus electric power can be determined.

Then, the supply-and-demand control apparatus 100 may include the control table 203. The supply-and-demand planning unit 200 may determine a future time (the first column) at which surplus electric power is generated. The control table 203 may store the generated second control parameter (the fifth column) and the time (the first column). The stored time is, for example, a point in time at which the solar power system 101 generates the second surplus electric power using the second control parameter (the fifth column). The supply-and-demand control unit 204 may allow the second surplus electric power generated at the time (the first column) to be used for generating heat, using the second control parameter when the second control parameter is a control parameter stored in association with the time identical to the current time.

Furthermore, the control table 203 may store the second control parameter (the fifth column) in association with the basic amount of stored electricity (the second column) and amount of stored heat (the third column) with which the second control parameter is generated. The supply-and-demand control unit 204 may allow the second surplus electric power to be used for generating heat, using the second control parameter stored in association with the stored amount of stored electricity and amount of stored heat when the current amount of stored electricity and amount of stored heat are respectively identical to the amount of stored electricity and amount of stored heat that are stored in the control table 203.

Furthermore, the supply-and-demand planning unit 200 may generate the first control parameter (the fourth column) as well as the second control parameter (the fifth column) for allowing the second surplus electric power to be used for generating heat. For example, the generated first control parameter is a control parameter for controlling the first surplus electric power to be stored in the electricity storage system 102. The supply-and-demand control unit 204 may control the first surplus electric power to be stored in the electricity storage system 102, using the generated first control parameter.

Here, the supply-and-demand planning unit 200 may generate the first control parameter corresponding to an amount of stored electricity and an amount of stored heat. For example, the first control parameter and the second control parameter may be stored in association with an amount of stored electricity, an amount of stored heat, and a time, using the control table 203. Then, the supply-and-demand control unit 204 may use each of the first control parameter and the second control parameter stored in association with the amount of stored electricity identical to the current amount of stored electricity, and others.

Here, the demand forecast unit 201 determines a demand for electric power to be generated by the solar power system 101 so that it may obtain demand forecast data for determining the remaining electric power other than the demand as the total surplus electric power, out of the electric power to be generated. The supply-and-demand planning unit 200 may generate the second control parameter for allowing an entire or part of the total surplus electric power determined from the demand forecast data (the second surplus electric power) to be used for generating heat.

The demand forecast unit 201 may obtain the demand forecast data for determining a demand at a future time. The supply-and-demand planning unit 200 may generate the second control parameter for allowing the entire or part of the total surplus electric power (the second surplus electric power) to be used for generating heat by determining the time at which the demand is determined by the obtained demand forecast data, as the time at which surplus electric power is generated.

The control table 203 may store the time at which the demand is determined by the obtained demand forecast data in association with the generated control parameter (the first control parameter and/or the second control parameter). The supply-and-demand control unit 204 may use the stored control parameter in association with the stored time, when the current time is identical to the basic time in the stored demand forecast data.

For example, the supply-and-demand planning unit 200 may determine the first electric power as an amount of the second surplus electric power (the fifth column) during when an amount of stored electricity (the second column) is a first amount of stored electricity smaller than a predetermined amount (morning in FIG. 6). In addition, the supply-and-demand planning unit 200 may determine the second electric power larger than the first electric power during when an amount of stored electricity is the second amount of stored electricity larger than the predetermined amount (afternoon in FIG. 6). Thereby, as an amount of stored electricity is larger, a larger surplus electric power may be used for generating heat. Thus, when an amount of stored electricity is sufficiently larger, a larger amount of heat is generated, so that a sufficient amount of electricity and a sufficient amount of heat can be reliably stored.

Furthermore, the supply-and-demand planning unit 200 may determine the relatively larger amount of the second electric power as the amount of second surplus electric power during when an amount of stored heat (the third column) is the first amount of stored heat smaller than a predetermined amount (a demanded amount of heat at a time closer to a time when surplus electric power is generated) (afternoon in FIG. 6). Furthermore, the supply-and-demand planning unit 200 may determine the relatively smaller amount of the first electric power during when an amount of stored heat is the second amount of stored heat larger than a predetermined amount (demanded amount), that is, in the morning in FIG. 6. Thereby, as an amount of stored heat is larger (relatively with respect to the demand) (in the morning), a smaller amount of surplus electric power may be used for generating heat. Thus, when an (relative) amount of stored heat is sufficiently larger, a larger amount of electric power is used, so that a sufficient amount of electricity and a sufficient amount of heat can be reliably stored.

As described above, an example of a process of determining an amount of the second surplus electric power is described. The process of determining an amount of the first surplus electric power may correspond to the process.

Here, it may be understood that the second control parameter is the control parameter (the third control parameter) in the seventh column of the table in FIG. 3. Furthermore, it may be understood that the second surplus electric power is the electric power with the amount indicated in the seventh column of FIG. 3.

Furthermore, it may be understood that the second control parameter includes parameters as a whole. For example, it may be understood that the second control parameter includes the control parameter in the seventh column (the third control parameter), and the control parameter in the eighth column (the fourth control parameter) in the table of FIG. 3. Furthermore, it may be understood that the second surplus electric power is electric power with a total amount of the electric power in the seventh column and the electric power in the sixth column. Here, each of the control parameters included in the second control parameter indicates an amount of electric power, so that a sum of these amounts of electric power is determined as an amount of electric power that should be used for generating heat.

Thus, when a system that supplies a building with energy, such electricity and heat, includes in particular energy storage units and the price of electricity dynamically fluctuates, the system can appropriately control energy devices, such as an electric generator and a heat source device. In other words, the building uses the supply-and-demand control apparatus 100 including: the demand forecast unit 201 that obtains demand forecast data indicating demand for each of electric power and heat; the supply-and-demand planning unit 200 that calculates a control parameter corresponding to an amount of electricity stored in an electricity storage unit and an amount of heat stored in a heat storage unit, using the demand forecast data; and the control table 203 that stores the control parameter using the amount of stored electricity and others as indices.

The supply-and-demand control apparatus 100 may communicate information through a network 100N (FIG. 1) installed in a house including the supply-and-demand control apparatus 100.

The network 100N may be, for example, a home area network, a wireless Local Area Network (LAN), and a wired LAN network.

Furthermore, the network 100N may be a controller area network (CAN) and a network with Building Automation and Control Networking protocol (BACNet).

In other words, for example, the supply-and-demand control apparatus 100 may receive, from a device, information for obtaining an amount of stored electricity from the electricity storage system 102 through the network 100N.

Furthermore, the supply-and-demand control apparatus 100 may transmit information to a device through the network 100N, for example, a control parameter to the heat pump 104.

Here, the supply-and-demand control unit 204 may obtain time information 204t (FIG. 2) indicating the current time.

In other words, the obtained time information 204t may be information generated by, for example, a timer and a clock.

For example, the supply-and-demand control apparatus 100 may include the clock from which the time information 204t is obtained.

As described above, the supply-and-demand control apparatus 100 may include a device that (i) generates energy (heat, etc.) in a state where another device, such as the heat pump 104, is operating and not stopping and (ii) does not generate energy in a stop state.

Then, the demand forecast unit 201 may determine the future demand for energy to be generated (heat, etc.).

In other words, the demand for a larger amount of heat (than a threshold) may be determined as a demand at a certain point in time, and the time at which the higher demand for heat may be determined.

The threshold may be, for example, 0.

For example, a control parameter for not distributing surplus-electric power to a device may be generated, as a control parameter for the stop state, by maintaining the stop state.

In other words, "not distributing surplus electric power" may imply, for example, either not distributing the power or not distributing most of the power (over a threshold).

In other words, for example, when a time is relatively more distant past than a time having the higher demand, a control parameter for not distributing the surplus electric power to a device (at all) may be generated as a control parameter at the time.

When the time is relatively recent past, a control parameter for distributing (at least a part of) surplus electric power to the device may be generated as a control parameter at the time.

Thereby, it is possible to appropriately distribute surplus electric power, and avoid unnecessary distribution thereof when there is no demand, such that no surplus electric power is distributed when the time having a large demand is more distant past.

In addition, energy is effectively used to match the demand at the time, by distributing the surplus electric power when the demand time is approaching.

Here, the (at least a part of) surplus electric power distributed at the time closer to the demand time may be electric power used for warming up the device (the heat pump 104).

Thereby, it is possible to avoid (i) the delay in time when the warming up starts because the device is warmed up until the demand time, and (ii) the delay in starting using the generated energy for the demand.

For example, the processing in which a mere known technique is used as a common method may be performed for the specific details herein.

The known technique to be used may be, for example, each of the aforementioned techniques of the prior art.

As described above, a control parameter (see, for example, the control parameter of data 203A in FIG. 3) at a certain time and another control parameter (see the control parameter of data 203B) at the certain time may be calculated.

Furthermore, the other control parameter may be a control parameter to be used when the forecast of demand is correct.

Furthermore, the other control parameter may be a control parameter to be used when the forecast of demand is not correct.

In other words, the supply-and-demand planning unit 200 may calculate and store the other control parameter to be used when the forecast of demand is not correct.

The stored other control parameter may be used when the forecast of demand is not correct.

In other words, the stored other control parameter may be calculated in advance, when a period during which it is not clear whether or not the forecast of demand is correct ends and before it is determined that the forecast of demand is not correct.

Thereby, after the determination, the other control parameter is calculated, and then, the control parameter is again calculated.

Thereby, there is no need to recalculate the control parameter, thus facilitating the processing.

Accordingly, for example, it is possible to, for example, avoid the delay in starting using the other control parameter.

As described above, for example, each of the control parameters may be calculated in a direction opposite to a direction that the time proceeds (forward direction).

More specifically, the other control parameter may be calculated in advance, for example, in the same manner as calculating it in the opposite direction.

In other words, first, a control parameter at a relatively late time (for example, the time t=2 in FIG. 3) may be calculated, and then a control parameter at a relatively early time (for example, the time t=1 in FIG. 3) may be calculated.

In other words, the order of calculating the control parameter may be changed from the late time (time t=2) to the early time (time t=1).

In other words, the order of the calculation may be in a direction opposite to a direction from a past point (time t=2) to a future point (time t=3) (the forward direction), that is, in a direction from the future point (time t=3) to the past point (time t=2).

In other words, the order of the calculation in the opposite direction has been assumed relatively more appropriate than the order of the calculation in the forward direction, through simulations, experiments, rational analyses, and others in the research and development.

In other words, it has been assumed that the calculation in the opposite direction is more appropriate, because the amount of calculation is relatively smaller.

Furthermore, it has been assumed that the calculation in the opposite direction is more appropriate, because the memory capacity necessary in the calculation is relatively smaller.

For example, when a target control parameter is calculated (for example, the control parameter at the time t=2), information obtained in calculating the control parameter (for example, the control parameter at the time t=3) prior to the target calculation is used.

Thus, when the control parameter is calculated in the opposite direction, the available information is information at a later time (t=3) obtained in calculating the control parameter at the time (t=3) later than that of the control parameter (t=2).

On the other hand, when the control parameter is calculated in the forward direction, the available information is information at an earlier time (t=1).

In other words, it has been assumed through simulations that the calculation in the opposite direction is more appropriate, because the information at the later time (t=3) may be used by calculating the control parameter in the opposite direction.

Furthermore, it has been assumed that the calculation in the forward direction is relatively more inappropriate, because the information at the earlier time (t=1) is used.

However, the control parameter may be calculated in the forward direction.

Thereby, since the control parameter is calculated in a direction identical to the temporal direction, a user can easily understand the calculation processing, the programming processing becomes easier, and the supply-and-demand control apparatus 100 can be relatively easily designed.

Embodiment 3

Figure 13:
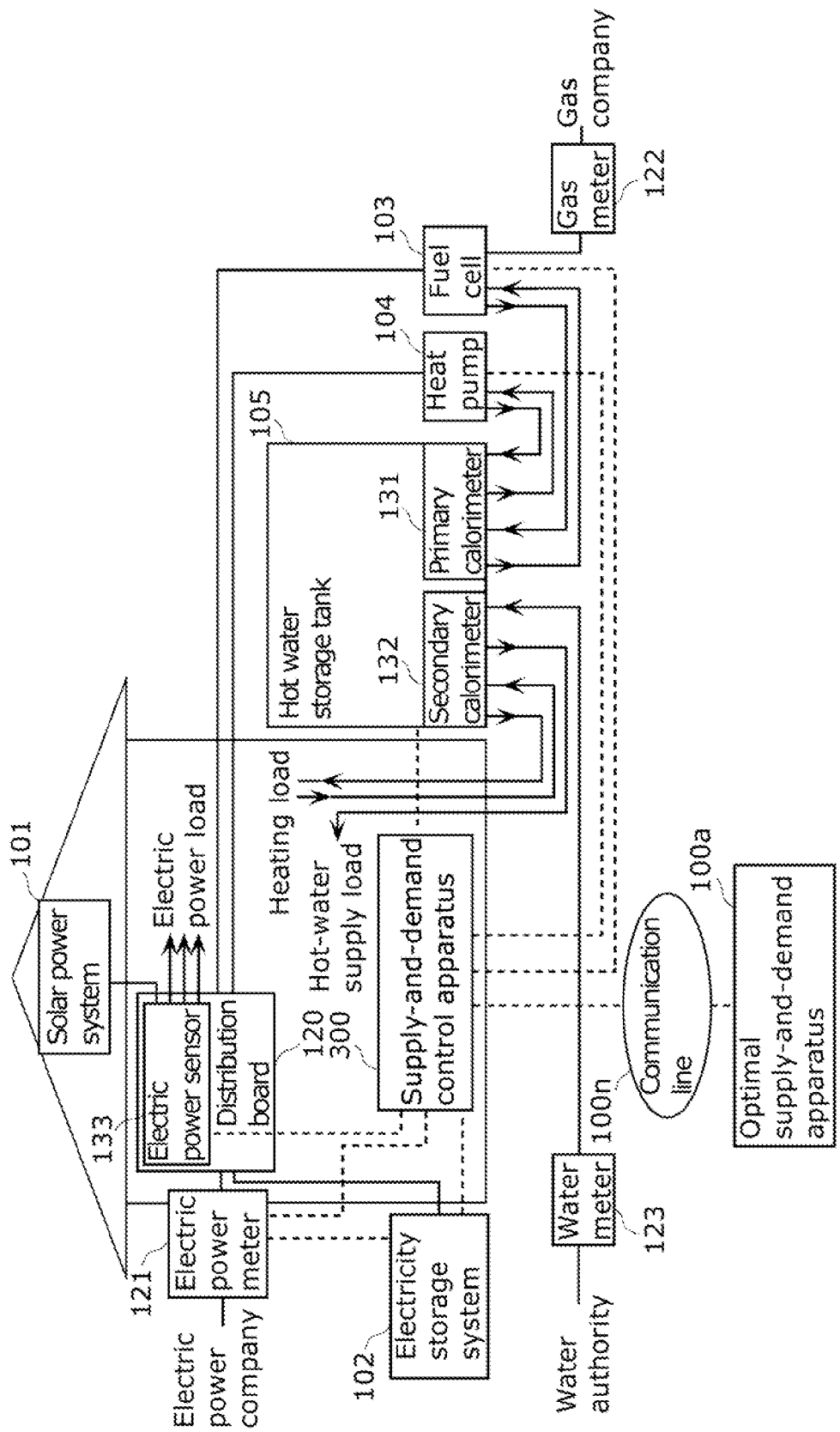
FIG. 13 illustrates a configuration of an energy supply-and-demand system.

FIG. 13 illustrates a configuration of an energy supply-and-demand system according to Embodiment 3.

Figure 14:
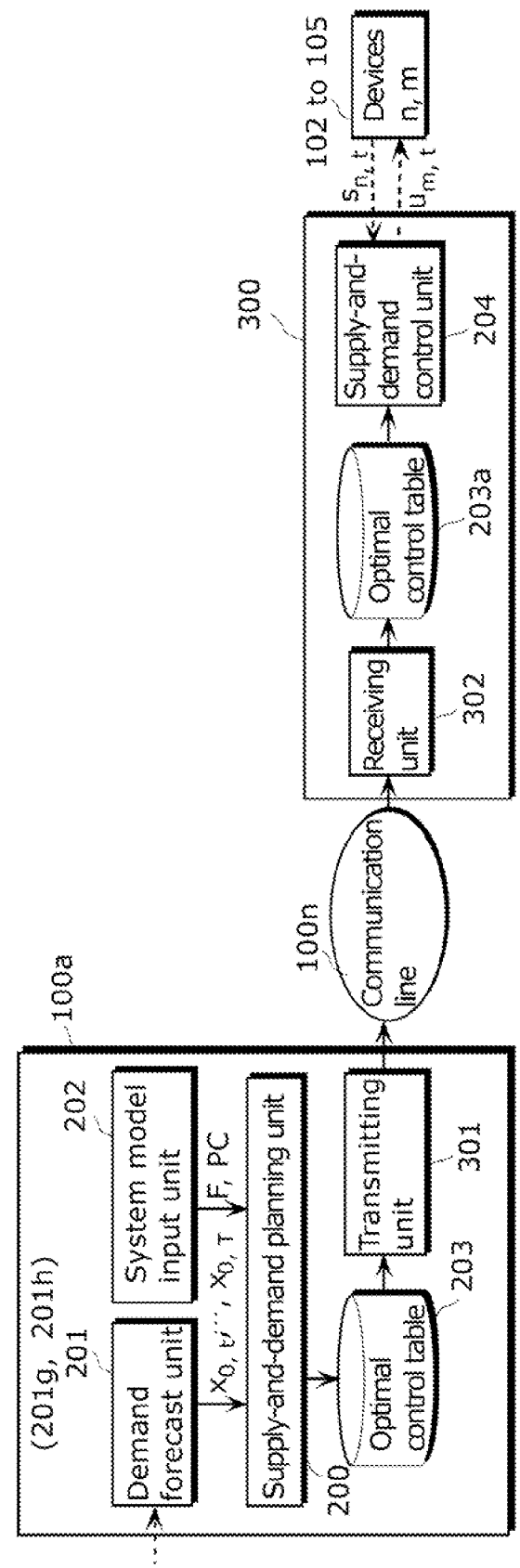
FIG. 14 illustrates a detailed configuration of an energy supply-and-demand system.

FIG. 14 illustrates a detailed configuration of the energy supply-and-demand system.

In addition to the configuration according to Embodiments 1 and 2, the energy supply system according to Embodiment 3 includes a server (cloud server, optimal supply-and-demand apparatus, the first supply-and-demand control apparatus) 100a and a supply-and-demand control apparatus (the second supply-and-demand control apparatus) 300, and the server 100a is connected to the supply-and-demand control apparatus 300 through a communication line 100n as illustrated in FIGS. 13 and 14.

According to Embodiment 3, not the supply-and-demand control apparatus 300 but the server 100a forecasts a demand (see Sj2 in FIG. 4 and Ss2 in FIG. 15 to be described later) and generates a control parameter (Sj3, Ss3).

Then, communication between the supply-and-demand control apparatus 300 and the server 100a is appropriately carried out (see Sr2, Ss1, Ss4, Sr3, and others), and the server 100a transmits the generated control parameter to the supply-and-demand control apparatus 300. The supply-and-demand control apparatus 300 stores the received control parameter in a control table to control operations of each device.

Embodiment 3 differs from Embodiment 1 and others by these points.

The server 100a may be, for example, a server of a manufacturer that has manufactured the supply-and-demand control apparatus 300.

Figure 15:
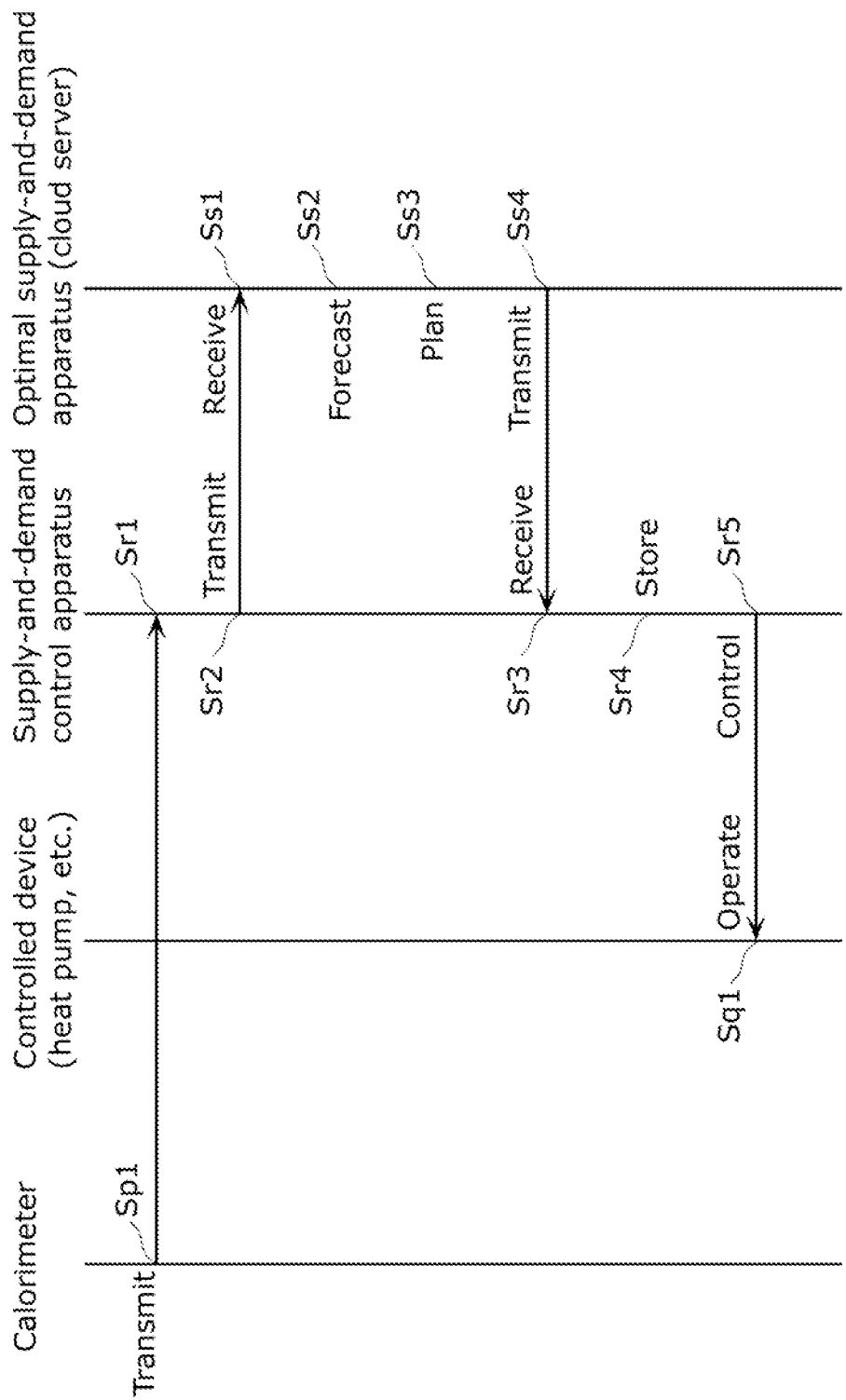
FIG. 15 illustrates a sequence diagram of processes performed in an energy supply-and-demand system.

FIG. 15 illustrates the procedure of the processing by the energy supply-and-demand system.

The server 100a may include a first obtaining unit 201g that obtains, through the communication line 100n (FIGS. 13 and 14) from the supply-and-demand control apparatus 300, (i) power consumption of a device that operates using the electric power in the electricity storage system 102 and (ii) heat consumption of a device that operates using the heat in the hot water storage tank 105 (Sr2, Ss1).

Furthermore, the first obtaining unit 201g may obtain the power consumption and heat consumption using a communicating unit. The communicating unit may be, for example, a part of a transmitting unit 301 (FIG. 14) that carries out communication of receiving and transmitting information.

Furthermore, the obtained heat consumption is, for example, information obtained from a secondary calorimeter 132 and others using the supply-and-demand control apparatus 300 (Sp1, Sr1).

Here, a part or entire of the communication line 100n may be, for example, the Internet.

The server 100a may include a forecast processing unit 201h and a supply-and-demand planning unit 200.

In other words, the forecast processing unit 201h may obtain demand forecast data on the electric power and an amount of heat, using the obtained power consumption and heat consumption (Ss2).

Then, the supply-and-demand planning unit 200 may calculate a control parameter for controlling, for each point in time from the current time to a future time, the amount of electricity stored in the electricity storage system 102, the amount of heat stored in the hot water storage tank 105, and operations of the electricity storage system 102 and a heat source device that supplies heat to the hot water storage tank 105 (such as the heat pump 104) by substituting the calculated demand forecast data into a predetermined function (Ss3).

In other words, for example, from among combinations of amounts of stored electricity, amounts of stored heat, and control parameters, an appropriate combination corresponding to the obtained demand forecast data (including control parameters) may be calculated (determined).

In other words, combinations (i) in which amounts of stored electricity and amounts of stored heat match to each other and (ii) which include appropriate control parameters to be used when in future, there is demand as specified in the obtained demand forecast data may be determined from among the combinations.

Furthermore, the supply-and-demand control apparatus 300 may include a receiving unit 302, a control table (optimal control table) 203a, and a supply-and-demand control unit 204.

The receiving unit 302 may obtain, through the communication line 100n, the calculated amount of stored electricity, amount of stored heat, and control parameter (Sr3, Ss4).

Then, the control table 203a may store data in which each of the obtained amount of stored electricity and amount of heat is stored in association with the obtained control parameter for each point in time from the current time to a future time (Sr4).

In other words, the data of the determined combination may be stored for each of the points in time.

Then, the supply-and-demand control unit 204 may obtain the current time information, and the current amount of stored electricity and amount of stored heat respectively from the electricity storage system 102 and the hot water storage tank 105 (Sr5).

Then, after obtaining the information, the supply-and-demand control unit 204 may identify a target control parameter from the control table 203a, using the obtained time information, and the current amount of stored electricity and amount of stored heat (Sr5).

Then, the supply-and-demand control unit 204 may control the operations of the electricity storage system 102 and the heat source devices, based on the identified control parameter (Sr5, Sq1).

In other words, the electricity storage system 102 may perform the operations determined according to the control (Sq1).

Then, the supply-and-demand planning unit 200 may calculate control parameters such that electric power generated by a predetermined power system (the solar power system 101 installed in a house including the supply-and-demand control apparatus 300) is distributed to the electricity storage system 102 and the heat source devices (Ss3).

In other words, the electricity storage system 102 is charged with the first electric power indicated by a generated control parameter, and the heat source devices may generate heat with the second electric power indicated by the generated control parameter.

More specifically, the generated electric power (surplus electric power included therein) may be divided into the first electric power for charging the electricity storage system 102 and the second electric power to be used by the heat source devices.

Thereby, the server 100a of the manufacturer that has manufactured the supply-and-demand control apparatus 300 obtains information, such as power consumption of a device, in a house including the supply-and-demand control apparatus 300.

Here, the obtained information of power consumption and others may be used, for example, by the manufacturer when the device in the house is out of order, and for the research and development of a device of the same type as the device.

Thereby, the server 100a of the manufacturer obtains information of power consumption to be used when the device is out of order only by appropriately controlling the electricity storage system 102 without performing any processing. Thereby, necessary information can be simply obtained.

Furthermore, as described above, the operations can be appropriately controlled using a control parameter with the obtained combination (see Sr3, Sr5, Sq1, and others).

The supply-and-demand control system may be a system including the one server 100a and supply-and-demand control apparatuses 300 installed in houses.

Then, the server 100a may perform processes for the supply-and-demand control apparatuses 300, such as forecasting, planning, and transmitting (see Ss2, Ss4, and others), based on the power consumption obtained from each of the supply-and-demand control apparatuses 300 (see Ss1 and others).

The control table 203 may be considered as a storage unit that stores data, or as data stored by the storage unit.

Here, data in the control table 203 may be data for identifying the policy of the control.

Furthermore, the supply-and-demand planning unit 200 may be a policy optimizer for optimizing the policy.

Although the present invention is described based on Embodiments, Embodiments are only examples of the present invention. In other words, the present invention may be implemented with embodiments other than Embodiments. More specifically, the present invention is not limited to Embodiments. Without departing from the scope of the present invention, the present invention includes an embodiment with some modifications on Embodiments conceived by a person skilled in the art, and another embodiment obtained through combinations of the constituent elements and steps of different Embodiments in the present invention.

The technique herein produces a synergistic effect in combination with the constituent elements (see FIG. 2 and others). In contrast, the known prior art does not produce a synergistic effect due to lacking in a part or entire of these constituent elements. In this respect, the technique herein differs from the prior art, and is superior to the prior art.

The present invention can be implemented not only as such an apparatus and a system, but also as a method using processing units included in the apparatus and others as steps, as a program causing a computer to execute such steps, as a recording medium on which the program is recorded, such as a computer-readable CD-ROM, and as information, data, or a signal indicating the program. Such a program, information, data, or a signal may be distributed via communication networks, such as the Internet.

The present invention is described based on, but not limited to, Embodiments. Without departing from the scope of the present invention, the present invention includes an embodiment with some modifications on Embodiments conceived by a person skilled in the art, and another embodiment obtained through combinations of the constituent elements and steps of different Embodiments in the present invention.

The supply-and-demand control apparatus according to the present invention includes an operation planning unit and a control table, and is useful for reducing the energy cost or the environmental cost of a building.

REFERENCE SIGNS LIST 100, 300 Supply-and-demand control apparatus
101 Solar power system
102 Electricity storage system
104 Heat pump 105 Hot water storage tank
200 Supply-and-demand planning unit
201 Demand forecast unit
201g Obtaining unit
201h Forecast processing unit
202 System model input unit
203, 203a, 203b Control table
204 Supply-and-demand control unit

The invention claimed is:

1. A supply-and-demand control apparatus, comprising:
an obtaining unit configured to obtain (i) power consumption of a device that operates using electric power and (ii) heat consumption of a device that operates using heat;
a forecast unit configured to obtain demand forecast data on electric power and an amount of heat, using the obtained power consumption and the obtained heat consumption, respectively;
a planning unit configured to calculate, for each point in time from a current time to a future time, an amount of electricity stored in an electricity storage device, an amount of heat stored in a heat storage device, and a control parameter for controlling operations of the electricity storage device and a heat source device that supplies heat to the heat storage device, by substituting the obtained demand forecast data into a predetermined function;
a storage unit configured to store a control table in which each of the amount of electricity and the amount of heat is associated with the control parameter for each of the points in time from the current time to the future time, the amount of electricity, the amount of heat, and the control parameter being calculated by the planning unit; and
a control unit configured to obtain current time information, and a current amount of stored electricity and a current amount of stored heat respectively from the electricity storage device and the heat storage device, to identify a target control parameter from the control table using the current time information, the current amount of stored electricity, and the current amount of stored heat that are obtained, and to control operations of the electricity storage device and the heat storage device based on the identified target control parameter,
wherein the planning unit is configured to calculate the control parameters such that electric power generated by a predetermined power system is distributed to the electricity storage device and the heat source device,
the predetermined function is a function derived from a system function and a cost function, the system function being for calculating the amount of electricity and the amount of heat at a time next to a certain time, and the cost function being for calculating an operating cost for each of the points in time, and
the planning unit is configured to calculate the control parameter by adding up smallest operating costs for each of the points in time starting from the future time and ending with the current time using the cost function.

2. The supply-and-demand control apparatus according to claim 1,
wherein the planning unit is further configured to obtain information on an operating state indicating whether or not the heat source device is operating,
the storage unit is further configured to store the control table in which the information on the operating state is associated with each of the amount of electricity, the amount of heat, and the control parameter for each of the points in time, and
the control unit is further configured to obtain information on a current operating state of the heat source device, and to identify the target control parameter from the control table using the obtained information on the current operating state.

3. The supply-and-demand control apparatus according to claim 1,
wherein the forecast unit is configured to obtain the demand forecast data on the electric power and the amount of heat, by computing the obtained power consumption and the obtained heat consumption, respectively.

4. The supply-and-demand control apparatus according to claim 1,
wherein the control unit is configured to obtain a current amount of stored electricity and a current amount of stored heat respectively from the electricity storage device and the heat storage device (i) at intervals identical to intervals of the times at which the control parameters are stored in the control table or (ii) at intervals shorter than the intervals of the times.

5. The supply-and-demand control apparatus according to claim 1,
wherein the control unit is configured to set a value of the identified target control parameter to a device to be controlled when the value of the identified target control parameter is different from a value of a control parameter set to the device to be controlled.

6. The supply-and-demand control apparatus according to claim 1,
wherein the planning unit is configured to calculate the control parameters such that the electric power generated by the predetermined power system is distributed to the electricity storage device and the heat source device according to electric power demand and heat demand of a user.

7. The supply-and-demand control apparatus according to claim 6,
wherein the electric power to be distributed to the electricity storage device and the heat source device is surplus electric power generated by the predetermined power system.

8. The supply-and-demand control apparatus according to claim 7,
wherein the planning unit is configured to generate the control parameters such that all of the surplus electric power is used by the heat source device.

9. The supply-and-demand control apparatus according to claim 7,
wherein the planning unit is configured to generate the control parameters such that a larger amount of the surplus electric power is used by the heat source device as the amount of electricity stored in the electricity storage device is larger.

10. The supply-and-demand control apparatus according to claim 7,
wherein the planning unit is configured to generate the control parameters such that a larger amount of the surplus electric power is used by the electricity storage device as the amount of heat stored in the heat storage device is larger.

11. The supply-and-demand control apparatus according to claim 1,
wherein the heat source device is at least one of a heat pump and a fuel cell.

12. A supply-and-demand control method, comprising:
obtaining (i) power consumption of a device that operates using electric power and (ii) heat consumption of a device that operates using heat;
obtaining demand forecast data on electric power and an amount of heat, using the obtained power consumption and the obtained heat consumption, respectively;
calculating, for each point in time from a current time to a future time, an amount of electricity stored in an electricity storage device, an amount of heat stored in a heat storage device, and a control parameter for controlling operations of the electricity storage device and a heat source device that supplies heat to the heat storage device, by substituting the obtained demand forecast data into a predetermined function;
storing a control table in which each of the amount of electricity and the amount of heat is associated with the control parameter for each of the points in time from the current time to the future time, the amount of electricity, the amount of heat, and the control parameter being calculated in the calculating; and
obtaining current time information, and a current amount of stored electricity and a current amount of stored heat respectively from the electricity storage device and the heat storage device, identifying a target control parameter from the control table using the current time information, the current amount of stored electricity, and the current amount of stored heat that are obtained, and controlling operations of the electricity storage device and the heat storage device based on the identified target control parameter,
wherein in the calculating, the control parameters are calculated such that electric power generated by a predetermined power system is distributed to the electricity storage device and the heat source device,
the predetermined function is a function derived from a system function and a cost function, the system function being for calculating the amount of electricity and the amount of heat at a time next to a certain time, and the cost function being for calculating an operating cost for each of the points in time, and
in the calculating, the control parameters are calculated by adding up smallest operating costs in each of the points in time starting from the future time and ending with the current time using the cost function.

13. A supply-and-demand control system comprising a server and a supply-and-demand control apparatus,
the server including:
a first obtaining unit configured to obtain, from the supply-and-demand control apparatus via a network, (i) power consumption of a device that operates using electric power and (ii) heat consumption of a device that operates using heat;
a forecast unit configured to obtain demand forecast data on electric power and an amount of heat, using the obtained power consumption and the obtained heat consumption, respectively; and
a planning unit configured to calculate, for each point in time from a current time to a future time, an amount of electricity stored in an electricity storage device, an amount of heat stored in a heat storage device, and a control parameter for controlling operations of the electricity storage device and a heat source device that supplies heat to the heat storage device, by substituting the obtained demand forecast data into a predetermined function,
the supply-and-demand control apparatus including:
a second obtaining unit configured to obtain, via the network, the amount of electricity, the amount of heat, and the control parameter that are calculated by the planning unit;
a storage unit configured to store a control table in which each of the amount of electricity and the amount of heat is associated with the control parameter for each of the points in time from the current time to the future time; and
a control unit configured to obtain current time information, and a current amount of stored electricity and a current amount of stored heat respectively from the electricity storage device and the heat storage device, to identify a target control parameter from the control table using the current time information, the current amount of stored electricity, and the current amount of stored heat that are obtained, and to control operations of the electricity storage device and the heat storage device based on the identified target control parameter,
wherein the planning unit is configured to calculate the control parameters such that electric power generated by a predetermined power system is distributed to the electricity storage device and the heat source device,
the predetermined function is a function derived from a system function and a cost function, the system function being for calculating the amount of electricity and the amount of heat at a time next to a certain time, and the cost function being for calculating an operating cost for each of the points in time, and
the planning unit is configured to calculate the control parameter by adding up smallest operating costs for each of the points in time starting from the future time and ending with the current time using the cost function.

14. A supply-and-demand control method, comprising:
obtaining, from a supply-and-demand control apparatus via a network, (i) power consumption of a device that operates using electric power and (ii) heat consumption of a device that operates using heat, the obtaining being performed by a server;
obtaining demand forecast data on electric power and an amount of heat, using the obtained power consumption and the obtained heat consumption, respectively, the obtaining being performed by the server;
calculating, for each point in time from a current time to a future time, an amount of electricity stored in an electricity storage device, an amount of heat stored in a heat storage device, and a control parameter for controlling operations of the electricity storage device and a heat source device that supplies heat to the heat storage device, by substituting the obtained demand forecast data into a predetermined function, the calculating being performed by the server;
obtaining, via the network, the amount of electricity, the amount of heat, and the control parameter that are calculated in the calculating, the obtaining being performed by the supply-and-demand control apparatus;
storing a control table in which each of the amount of electricity and the amount of heat is associated with the control parameter for each of the points in time from the current time to the future time, the storing being performed by the supply-and-demand control apparatus; and
obtaining current time information, and a current amount of stored electricity and a current amount of stored heat respectively from the electricity storage device and the heat storage device, identifying a target control parameter from the control table using the current time information, the current amount of stored electricity, and the current amount of stored heat that are obtained, and controlling operations of the electricity storage device and the heat storage device based on the identified target control parameter, the obtaining, the identifying, and the controlling being performed by the supply-and-demand control apparatus, wherein in the calculating, the control parameters are calculated such that electric power generated by a predetermined power system is distributed to the electricity storage device and the heat source device, the predetermined function is a function derived from a system function and a cost function, the system function being for calculating the amount of electricity and the amount of heat at a time next to a certain time, and the cost function being for calculating an operating cost for each of the points in time, and in the calculating, the control parameters are calculated by adding up smallest operating costs in each of the points in time starting from the future time and ending with the current time using the cost function.

* * * * *